(12) United States Patent
Okada et al.

(10) Patent No.: US 6,419,577 B1
(45) Date of Patent: *Jul. 16, 2002

(54) SEMI-REAL TIME SIMULATION TYPE VIDEO GAME DEVICE

(75) Inventors: Hiroshi Okada; Takuya Nakayama; Masataka Sekiguchi, all of Tochigi-ken (JP)

(73) Assignee: Kabushiki Kaisha Bandai, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,342

(22) Filed: Mar. 18, 1999

(30) Foreign Application Priority Data

Mar. 20, 1998 (JP) .......................... 10-092759

(51) Int. Cl.[7] ................................. A63F 9/22
(52) U.S. Cl. ............... 463/1; 463/7; 463/41; 463/42; 463/43; 463/40
(58) Field of Search ............... 463/40–42, 1, 463/7

(56) References Cited

U.S. PATENT DOCUMENTS

| | | | | |
|---|---|---|---|---|
| 4,738,451 A | * | 4/1988 | Logg ..................... | 273/153 R |
| 5,586,257 A | * | 12/1996 | Perlman ..................... | 463/42 |
| 5,746,656 A | * | 5/1998 | Bezick et al. ............ | 463/42 |
| 5,890,963 A | * | 4/1999 | Yen ..................... | 463/42 |
| 5,947,823 A | * | 9/1999 | Nimura ..................... | 463/32 |
| 5,954,332 A | * | 9/1999 | Mero et al. ............ | 273/236 |
| 5,964,660 A | * | 10/1999 | James et al. ............ | 463/1 |
| 5,971,855 A | * | 10/1999 | Ng ..................... | 463/42 |
| 5,984,787 A | * | 11/1999 | Redpath ............ | 463/42 |
| 6,009,458 A | * | 12/1999 | Hawkins et al. ........ | 709/203 |
| 6,012,984 A | * | 1/2000 | Roseman ............ | 463/42 |
| 6,050,898 A | * | 4/2000 | Vange et al. ............ | 463/42 |
| 6,080,063 A | * | 6/2000 | Khosla ............ | 463/42 |

* cited by examiner

*Primary Examiner*—Joe H. Cheng
*Assistant Examiner*—Carmen D. White
(74) *Attorney, Agent, or Firm*—Smith, Gambrell & Russell LLP

(57) ABSTRACT

When a plurality of players play a simulation game in a plurality of user stations connected to a single game management station via a network, each player is not restrained in a game space over a lengthy period of game time while maintaining the reflection of a strategic intention of each player on the progress of a game. A process for player character selection enables the strategic character selection reserved at a suitable point of time by player character selection reservation system to be the effective selection only at a point of character encountering time appearing every fixed period of time. A player character encountering event decision system enables the strategic search route setting reserved at a suitable point of time by a player character encountering event reservation system to be the effective setting only at a point of character encountering time appearing every fixed period of time.

6 Claims, 21 Drawing Sheets

| | |
|---|---|
| CREATURE 1 | 1 |
| CREATURE 2 | 1 |
| CREATURE 3 | 2 |
| CREATURE 4 | 1 |
| CREATURE 5 | 1 |
| CREATURE 6 | 1 |
| CREATURE 7 | 1 |
| CREATURE 8 | 1 |
| CREATURE 10 | 1 |
| VEHICLE 2 | 1 |
| VEHICLE 3 | 1 |

(B) → d1

| POSITION | CHARACTER | DF | AF | AG1 | SIZE OR MAX |
|---|---|---|---|---|---|
| LEFT/UPPER | CREATURE 2 | 5 | 1 | 6 | 3 |
| UPPER | CREATURE 5 | 4 | 3 | 4 | 4 |
| RIGHT/UPPER | CREATURE 10 | 5 | 3 | 10 | 7 |
| LEFT | CREATURE 1 | 10 | 5 | 8 | 1 |
| CENTER(VEHICLE) | VEHICLE 3 | 12 | - | - | 22 |
| RIGHT | CREATURE 4 | 6 | 3 | 9 | 3 |
| LEFT/LOWER | CREATURE 6 | 8 | 5 | 6 | 2 |
| LOWER | CREATURE 3 | 2 | 4 | 6 | 1 |
| RIGHT/LOWER | CREATURE 7 | 6 | 4 | 9 | 1 |

(C) → e1

| POSITION | CHARACTER | DF | AF | AG1 | SIZE OR MAX |
|---|---|---|---|---|---|
| LEFT/UPPER | CREATURE 3 | 2 | 4 | 6 | 1 |
| UPPER | CREATURE 5 | 4 | 3 | 4 | 4 |
| RIGHT/UPPER | CREATURE 6 | 8 | 5 | 6 | 2 |
| LEFT | CREATURE 1 | 10 | 5 | 8 | 1 |
| CENTER(VEHICLE) | VEHICLE 3 | 12 | - | - | 22 |
| RIGHT | CREATURE 10 | 5 | 3 | 10 | 7 |
| LEFT/LOWER | CREATURE 8 | 2 | 1 | 12 | 2 |
| LOWER | CREATURE 3 | 2 | 4 | 6 | 1 |
| RIGHT/LOWER | CREATURE 2 | 5 | 1 | 6 | 3 |

SEMI-REAL TIME SIMULATION TYPE VIDEO GAME DEVICE

FIELD OF THE INVENTION

This invention relates to an improvement in a simulation type video game device in which a simulation type game is electronically executed between players opposed on a communication network using a video game device realized by a computer as a terminal device on a communication network such as the Internet, and particularly to a video game device of a semi-real time simulation type in which the time simulation operation constituting the game is an intermittent operation having a time base featuring a character encountering time that appears every character encountering period for a fixed time.

BACKGROUND OF THE INVENTION

For example, simulation type games such as Diabro have been heretofore extensively played. This kind of game, however, is generally restricted by (1) complicatedness of game computation, (2) an actual need to secure a larger scale game space (for example, a game room), and (3) lengthy period of game time. Due to the above restrictions (1) (2) (3) the game is usually played on a small scale by several players. Incidentally, in view of recent developments and popularization of computer techniques and communication network techniques, many members of the public have been made generally aware of the execution of this kind of game using a video game device realized by a computer as a terminal device on the communication network such as a Internet. If so, an imaginary game space is formed on the communication network by a computer whereby an enormous number of players, based on lovers of the game, scattered in a wide range of regions, can simultaneously participate in the game in an imaginary game space where a game computing process is accomplished by a computer in an attempt to overcome the aforementioned (1) restriction of game computation and (2) restriction of the game space. Thus enabling the great expectation of a variety of game developments and the strengthening of game unexpectedness. Even in that case, there is not attained the goal of simulating the normal game, wherein a plurality of players gather in an actual game space to acquire the cooperative negotiation and hostile restraint through the whole expression, with suitable players acquiring the cooperative negotiation and hostile restraint through the transmission of bilateral messages, in which point the richness of the game could be maintained somehow.

However, the above point (3) (restriction of the lengthy games) is serious. In the simulation type game of this kind, out of events in the game, a considerable game component, depending on the game rules, is a strategic event. That is, an event for which a player's strategic intention is reflected in the game play. A remaining considerable game component, again depending on the game rules, is an unexpected event, that is, an event for which a player's strategic intention is not reflected thereon. The mixing ratio of both greatly contributed to the characterization of the game. Then, in the strategic event, it is indispensable for a player to reflect on the game at the time of occurrence of the event, his counter strategic intention against the strategic intention of an opposite player in the previous game process. This means naturally that in the case where the simulation type game proceeds at real time (progress of actual time), each player always should be presented in the actual or imaginary game space in order that each player's strategic intention reflects on the strategic event for which the occurrence time is not controllable by each player. With this, lovers of games who are scattered in a wide range in terms of geography can participate in the game as players by making use of the communication network, but as the number of players increases, the number of strategic events during a period of game time also increases accordingly. This results in a lengthy period of time which is necessary for the completion of the game and which reaches that the presence of a player from start to finish. In summary, even if the above problem (1) (of complicatedness of game computation) should be solved by the high speed computer operation, and the above problem (2) (of large actual game space) should be solved by the players' participation in imaginary game spaces from the scattered residential space by means of the computer and a communication network, as long as the simulation type game proceeds at real time, any attempt to reflect each player's strategic intention on the strategic event, creates an inconvenience due to the lengthy period of game time. That is, there is encountered a problem of antinomy, i.e., the reflection of strategic intention versus an inconvenience resulting from a lengthy period of game time. In this respect, the present invention is directed at providing a semi-real time simulation type video game device which can drastically overcome the inconvenience of lengthy period of game time while maintaining the reflection of each player's strategic intention on the strategic event in an attempt of overcoming the problem of antinomy as described above.

SUMMARY OF THE INVENTION

The invention is intended to provide an arrangement that lessens the problem involved with the contradicting choice between the reflection of a player's strategic intention on the strategic event proceeding at real time and the acceptance of the inconvenience resulting from the lengthy delay of game time with respect to conventional game devices of the simulation type. The reservation of character selection at a suitable point in time by each player is finalized to ensure an effective selection on a particular point of character encountering time appearing during every character encountering period of time, which is fixedly set in advance through a period of game time. The reservation of a character encountering event candidate among players at a suitable point in time by each player defines an intermittent character encountering event. Also under the present invention, a character simulation game operation between a pair of teams of characters relating to the character encountering event is executed in an effort to overcome the aforementioned "antimony" problem. The presence of each player from start to finish in an actual game space in the other time zone during a period of game time which requires no reservational securement of the reflection of the strategic intention at a point of character encountering time is made unnecessary. This is done while reservationally securing the reflection of the strategic intention of each player with respect to the character selection and the character encountering event decision which constitutes a strategic event defined at a point of character encountering time appearing intermittently. In this way, there is avoided the inconvenience resulting from lengthy game time.

Thus, when a player performs the player character selection reservation instruction operation of the present invention at a suitable point in time, a player character selection reservation means A responsively reserves the selection of one team of player characters, whereas, when either of one or more opposing players performs the opposing character selection reservation instruction operation at a suitable point in time during that period, opposing character selection reservation means B responsively reserves one team of opposite characters. Thereafter, in the semi-real time simulation type video game device according to this invention, player character selection means C selects the already reserved one team of player characters as one team of player characters as one team of player characters to participate in the game at every point of character encountering time which appears intermittently once every character encountering time which appears intermittently once every character encountering period of time preset during the game time. Also, during this opposite character selection means D similarly selects the already reserved one team of opposite characters as one team of opposite characters to participate in the game at every point of character encountering time to ensure the reflection on a strategic event, of strategic game elements in terms of organization of a team of characters reserved at a suitable point in time by both player and said opposite player as their strategic intention. When said player further performs a player character encountering event candidate reservation instruction operation at a suitable point in time, player character encountering event candidate reservation means E responsively reserves a player character encountering event candidate between one team of player characters input by said player and one team of opposite characters input by the one or more opposite players. In this way, when the one or more opposite players similarly performs the opposing character encountering event candidate reservation instruction operation at a suitable point in time, opposite character encountering candidate reservation means F reserves responsively the opposing character encountering event candidate between the one team of opposite characters input by an opposite player and the one team of player characters input by said player. Thereafter, player character encountering event decision means G decides on an already reserved player character encountering event candidate to define a player character encountering event at apoint of character encountering time. Similarly, opposite character encountering event decision means H decides on the already reserved opposite character encountering event candidate to define an opposite character encountering event at a point of character encountering time to ensure the reflection of a player intention on a strategic event of one of the strategic game elements. Thus, in terms of a character encountering event, the strategic event can include, for example, a search route, for the purpose of character encountering reserved at a suitable point in time by said player and by an opposite player as their strategic intention. Then, player character simulation game operation means I executes a player character simulation game operation depending on a game rule between one team of player characters and one team of opposite characters which are opposed to each other in a player character encountering event decided at a point of character encountering time to calculate the results of player character simulation. During this time, opposite character simulation game operation means J executes opposite character simulation game operation depending on the same game rule between one team of opposite characters and one team of player characters which are opposed to each other in an opposite character encountering event to calculate the results of opposite character simulation. Further, succeeding player character simulation display means K displays the already selected one team of player characters, the already decided player character encountering event and the already calculated player character simulation results. Succeeding opposite character simulation display means L similarly displays the already selected one team of opposite characters, the already decided opposite character encountering event and the already calculated opposite character simulation results.

One embodiment of the invention operates as follows: One team of player characters or one team of opposite characters is divided into (1) a single "vehicle" character characterized at least by the maximum character carrying capacity (MAX) and durable force (HP) and (2) a plurality of "creature" characters characterized at least by weight (SIZE), durable force (HP), attack force (AP) and attack order, and "creative" characters are carried on a "vehicle" character so that the total weight (SIZE) does not exceed the maximum character carrying capacity (MAX) of the "vehicle" character.

The invention can also operate as follows: player character encountering event decision means G selectively designates a suitable plurality of nodes out of a plurality of nodes on a background route fixedly preset on a background map to form an opposite character search route by means of tying a plurality of nodes selectively designated, further designates one out of a plurality of nodes on an opposite character search route by means of advancing on each of a plurality of nodes on the opposite character search route every point of character encountering time in accordance with the predesignated order, and decides a player character encountering event when the designated node coincides with one node on a player character search route designated by said opposite character encountering event decision means H; and similarly opposite character encountering event decision means H selectively designates a suitable plurality of nodes out of a plurality of nodes on a background route fixedly preset on a background map to form a player character search route by means of tying a plurality of nodes selectively designated, further designates one out of a plurality of nodes on a player character search route by means of advancing on each of a plurality of nodes on the player character search route every point of character encountering time in accordance with the predesignated order, and decides an opposite character encountering event when the designated node coincides with one node on an opposite character search route designated by said player character encountering event decision means G.

An embodiment of the invention operates as follows: player character simulation game operation means I further includes: (1) attack preference player character decision means for deciding an attack preference player "creature" character in accordance with the attack order of every "creature" character or that of every "creature" character position in one team of player characters and the attack order of every "creature" character or that of every "creature" character position in one team of opposite characters opposed on one team of player characters; (2) opposite "creature" character durable force update means for executing an attack from an attack preference player "creature" character on an opposite "creature" character occupying a battle position in relation to a position of the attack preference player "creature" character in one team of opposite characters opposed, and subtracting the attack force (AP) of the attack preference player "creature" character from the durable force (HP) of the opposite "creature" character to update the durable force (HP) of the opposite "creature" character, (3) opposite "vehicle" character durable force update means for executing an attack from the attack preference player "creature" character on an opposite "vehicle" character in one team of opposite characters opposed when the durable force (HP) of the opposite "creature" character occupying a battle position in relation to a position of the attack preference player "creature" character is distinguished, and subtracting the attack force (AP) of the attack preference player "creature" character from the durable force (HP) of the opposite "vehicle" character to update the durable force (HP) of the opposite "vehicle" character; and (4) player character battle result counting means for counting the player character battle results when the updated durable force (HP) of the opposite "vehicle" character is distinguished. The opposite character simulation operation means J further includes: (1) attack preference opposite character decision means for deciding an attack preference opposite "creature" character in accordance with the attack order of every "creature" character or that of every "creature" character position in one team of opposite characters and the attack order of every "creature" character or that of every "creature" character position in one team of player characters opposed on one team of opposing characters; (2) player "creature" character durable force update means for executing an attack from the attack preference opposite "creature" character on a player "creature" character occupying a battle position in relation to a position of the attack preference opposite "creature" character in one team of opposite characters, and subtracting the attack force (AP) of the attack preference opposite "creature" character from the durable force (HP) of the player "creature" character to update the durable force (HP) of the player "creature" character; (3) player "vehicle" character durable force update means for executing an attack from the attack preference opposite "creature" character on a player "vehicle" character in one team of player characters opposed when the durable force (HP) of the player "creature" character occupying a battle position in relation to a position of the attack preference opposite "creature" character is distinguished, and subtracting the attack force (AP) of the attack preference opposite "creature" character from the durable force (HP) of the player "vehicle" character to update the durable force (HP) of the player "vehicle" character; and (4) opposing character battle result counting means for counting the opposing character battle results when the durable force (HP) of the updated player "vehicle" character is distinguished.

In another embodiment of the invention the device operates as follows: One team of player characters comprises a single player character, and one team of opposite characters comprises a single opposite character, while another embodiment operates as follows: The attack order is determined on the basis of the quickness (AGI) depending on each character.

BRIEF DESCRIPTION OF THE PREFERRED EMBODIMENTS

The preferred embodiments of this invention will now be described with reference to FIG. 1 and others.

FIGS. 4, 5, 6, 8, 9, 10, 11, 12, 13, 14, 15 and 17 are respectively flowcharts for the programs executed in the computer 3a in the game management station 3.

Figure 18A:
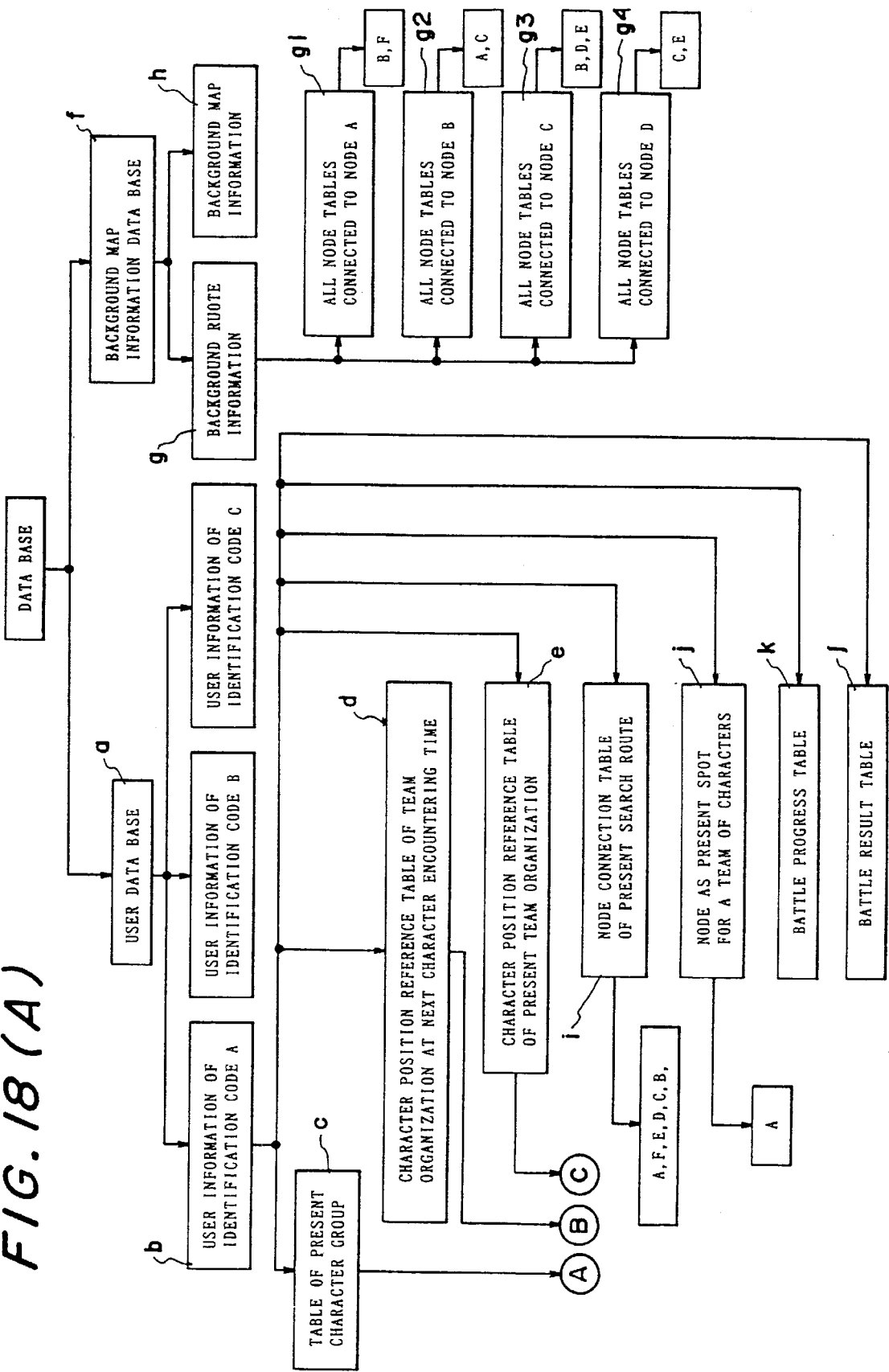

FIG. 18 is an explanatory view showing the constitution of the data base stored in a hard disk 3e of the game management station 3.

Figure 19:
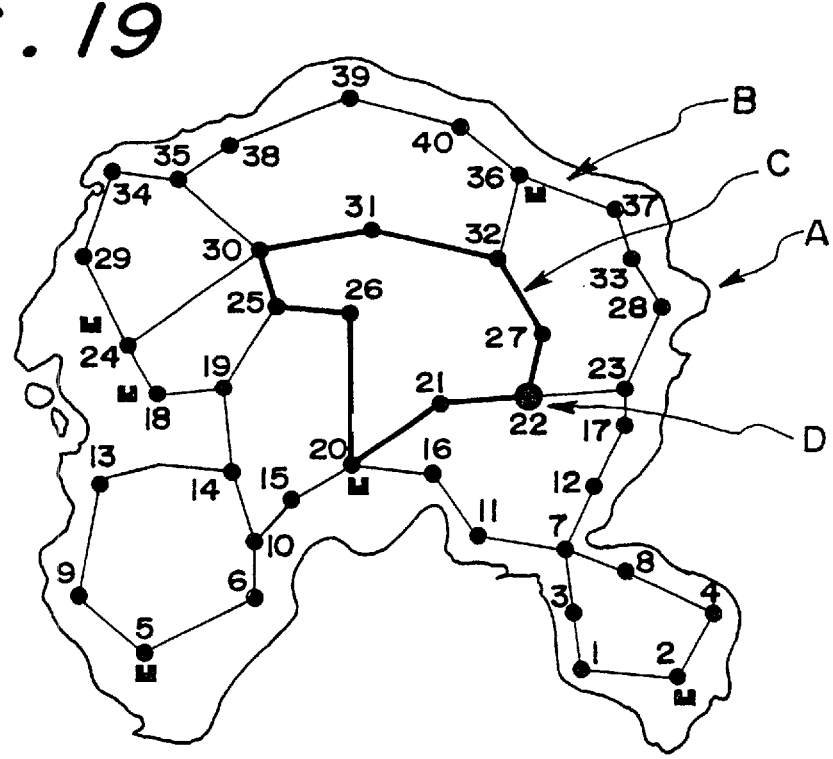

FIG. 19 is an explanatory view illustrating a common background map, a common background route, a search route set as a part or the whole of the background route, and a figure of a node at the present spot of a team player characters relating to the user station 2A on a search route displayed by a display device 2e of the user station 2A in a preferred embodiment according to this invention.

Figure 20:
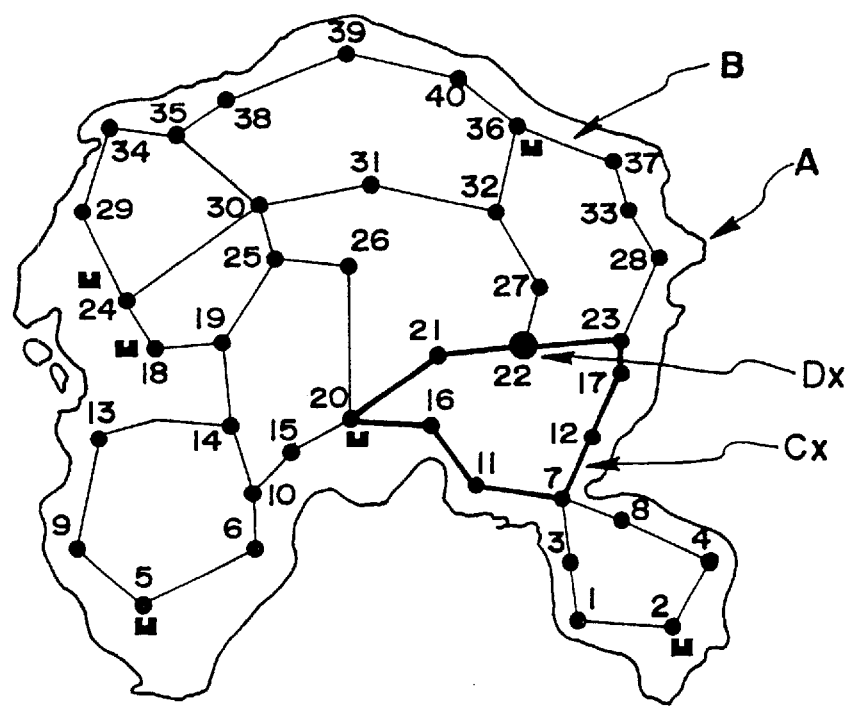

FIG. 20 is an explanatory view illustrating a background map, a background route, a search route, and a figure of a node at the present spot of a team of opposite characters relating to the user station on the search route displayed by the display device of the user station other than the user station 2A in a preferred embodiment according to this invention.

Figure 21:
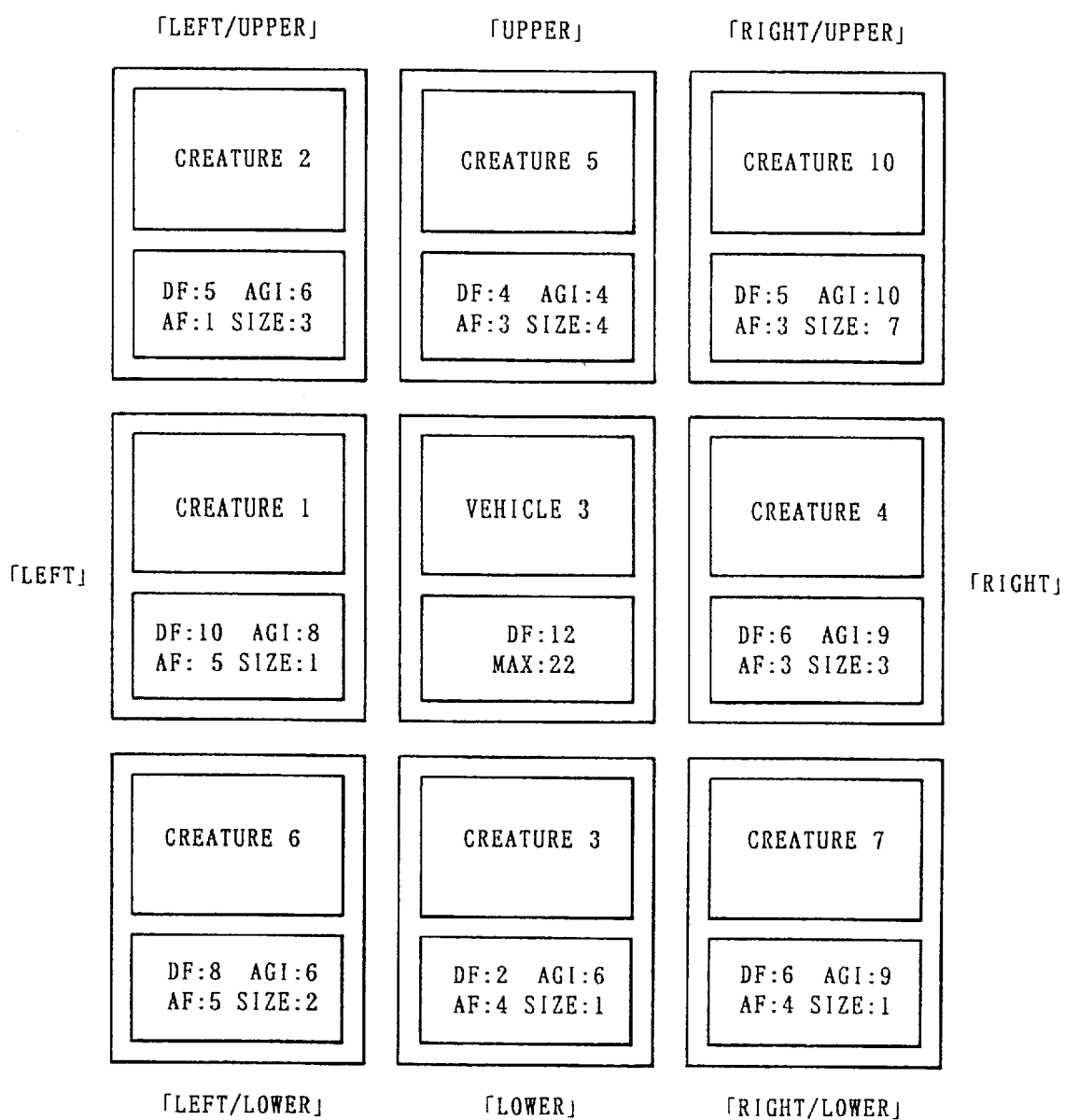

FIG. 21 is an explanatory view showing the organization of one team of characters in a preferred embodiment according to this invention.

DETAILED DESCRIPTION OF THE PREFERRED EMBODIMENTS

The preferred embodiments of this invention will now be described with reference to FIGS. 1 and others.

Figure 2:
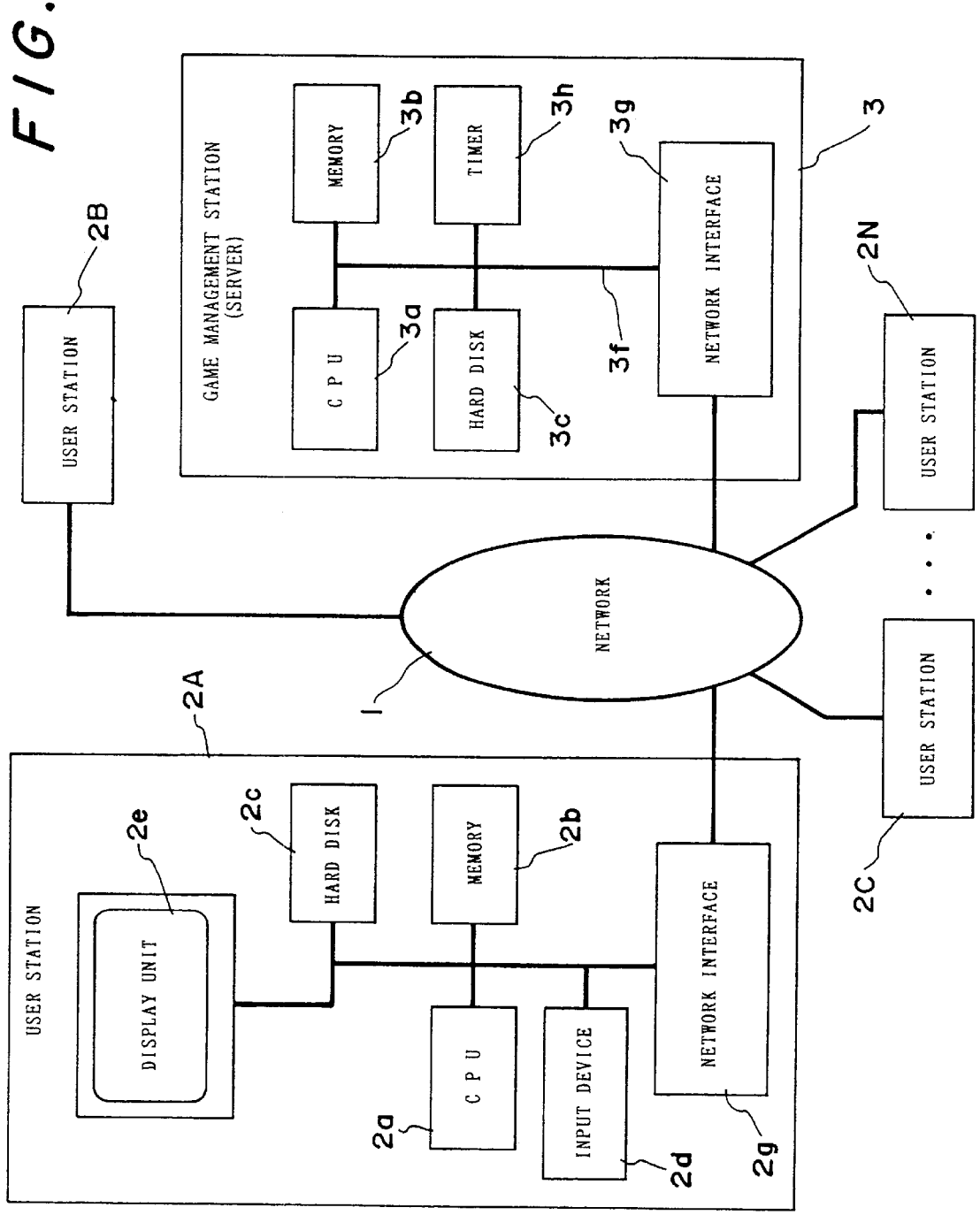
FIG. 2 is a block diagram showing the constitution on a hardware in a preferred embodiment according to this invention.

FIG. 2 is a block diagram showing components on the hardware of the entire device according to one embodiment.

To a communication network 1 such as an Internet or an Intranet network are connected a plurality of user stations 2A, 2B, 2C, . . . 2N and a single game management station 3 which functions as a server. Physically, the stations form, a party line structure where a plurality of user stations are commonly connected with a single communication channel in the shape of a so-called "moniliform tying". However, from the viewpoint of information, an exchange network of 1:N is constituted between a single game management station 3 and the N number of the user stations 2A, 2B, . . . 2N radially disposed.

Out of the N number of user stations, one user station 2A is provided with a computer 2a, a random access memory (RAM) 2b which principally stores a program itself and secures a temporary memory in execution of the program, a hard disk 2c for storing data base delivered and received between the game management station 3 and the hard disk 2c, an input device 2d provided with a conventional keyboard and a mouth to input various instruction operating signals to the computer 2a, a CRT (cathode ray tube), and the like, and includes a display device 2e visually displaying various information output via the computer 2a. These components are connected mutually through a conventional bus. Further, the computer 2a is mutually connected to the network 1 via a network interface 2g on the aforementioned bus.

On the other hand, the single game management station 3 includes a computer 3a, a memory (RAM) 3b which principally stores a program itself and secures a temporary memory in execution of the program, and a hard disk 3c for storing data base delivered and received between the respective game stations 2A, . . . 2N, these components being mutually connected through a conventional bus 3f. The computer 3a here is mutually connected to the network 1 via a network interface 3g on the bus 3f. A timer 3h connected to the bus 3f of the game management station 3 is provided to define the character encountering time for periodic processing.

In the user station 2A, when a player who operates it performs a character selection reservation instruction operation at a suitable point of time, the computer 2a in the user station 2a executes a program whereby a series of jobs on the side of the user station relating to a character selection reservation process for reservedly selecting one team of characters on the player side are executed. That is, the computer 2a starts the character selection reservation process in response to the character selection reservation instruction operation by the depression of a fixed key on the keyboard as the input device 2d (a in FIG. 3). The player designates a user identification code for specifying the user station 2A operated by the user, and then places a transfer request (Request 1 in FIG. 3)

Figure 3:
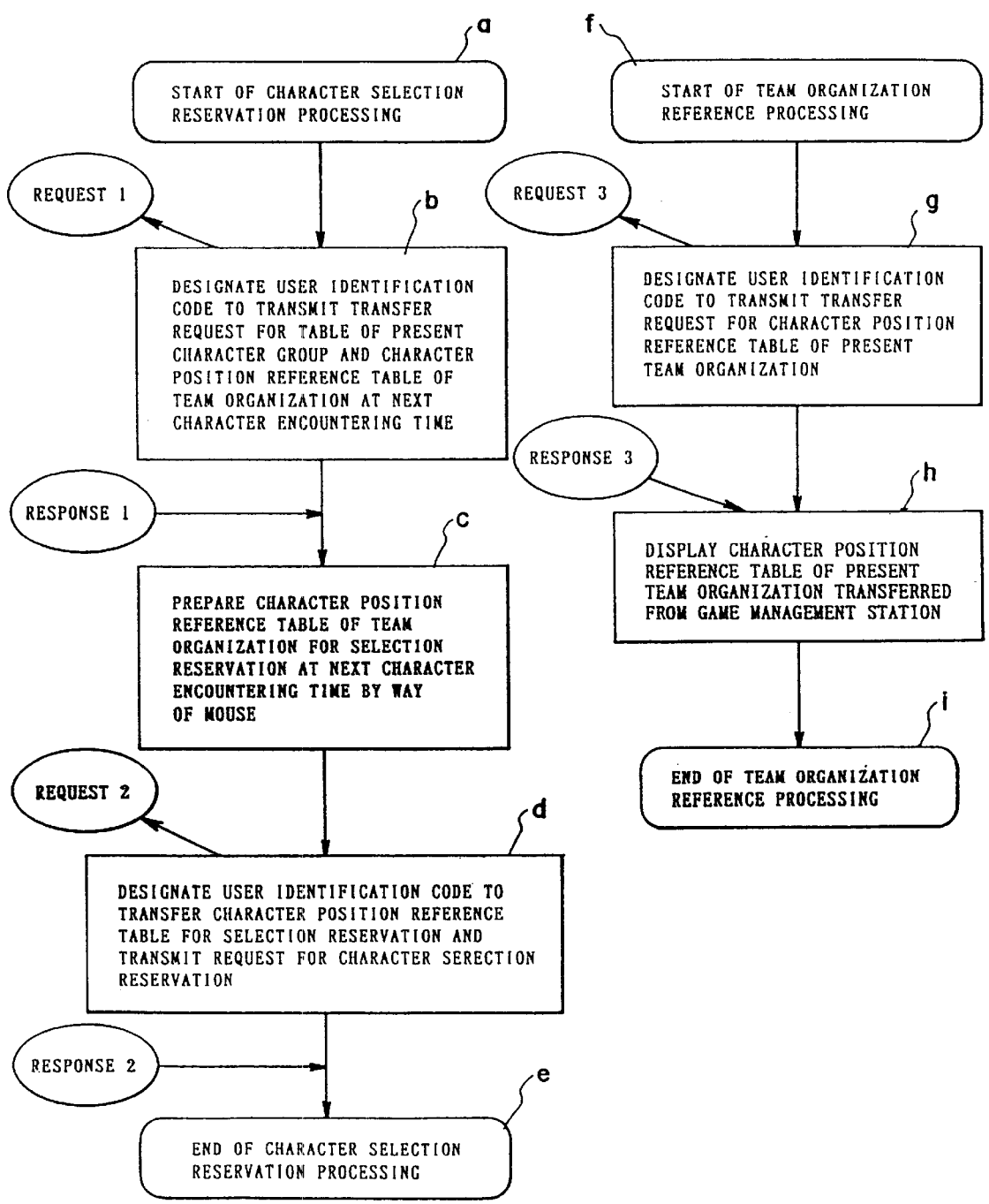
FIGS. 3, 7 and 16 are respectively flowcharts for a program executed in the computer 2a in the user station 2A in a preferred embodiment according to this invention.
Figure 4:
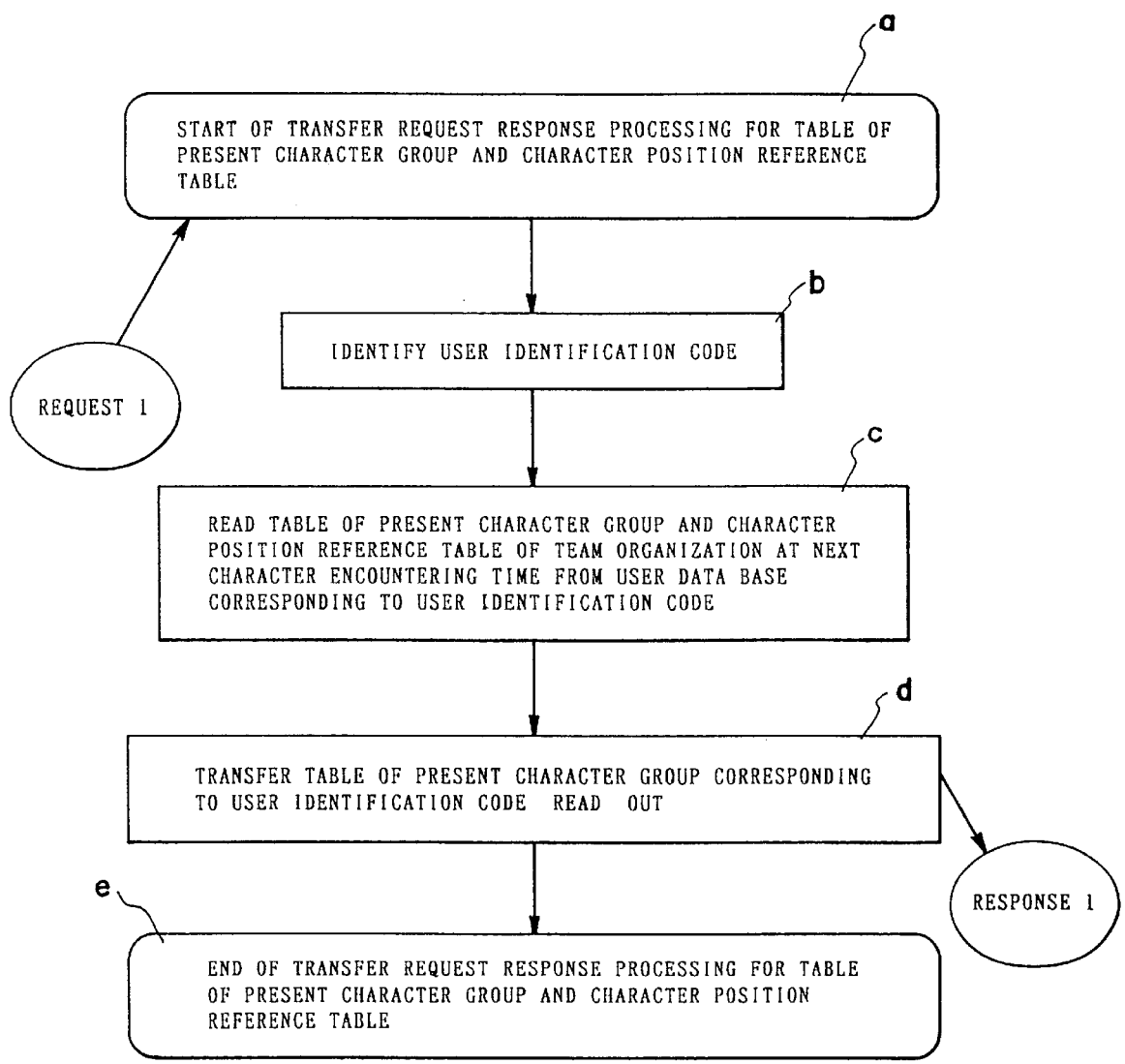

(i) for a table of an effective group of characters which are usable for the user station,
 (ii) for a table of a selected group of characters as game elements for a next point of character encountering time, which, in a typical embodiment, features nine characters organized as a team to participate in the battle simulation for the simulation game at a next point of character encountering time, and
 (iii) for a character position reference table which specifies a position (arrangement) of each character organized by team on the game, typically a battle position, to transmit to the game management station 3 on the network 1 via the network interface 2g (b in FIG. 3). Then, the game management station receives such a transfer request on the network 1, via the network interface 3g, and the computer 3a, and thereby executes a program to execute a series of jobs on the game management stations side relating to the character selection reservation process. That is, the computer 3a starts the transfer request response process for the table of a group of effective characters and the character position reference table (a in FIG. 4) to immediately identify a user identification code relating to the transfer request (Request 1 in FIG. 4). The computer 3a accesses an address in an address region assigned to user information (b in FIG. 18) relating to the user identified by the process of b in FIG. 4, in the user data base (a in FIG. 18) shown in FIG. 18, to thereby read a table of a group of characters that can be used by the player operating the user station 2A and a character position reference table (d in FIG. 18) relating to the player (d in FIG. 4), which are transferred to the designating user station for response (d in FIG. 4, Response 1). Computer 3a then terminates the transfer request response process for such tables (e in FIG. 4) to complete the transfer request response processing.

On the other hand, in the user station 2A, the computer 2a receives the Response 1 from the game management station 3 to display on the image plane of the display device 2e the character position reference table for specifying the team organization for a next point of character encountering time being transferred. Characters and their positions on the character and position reference table for a next point of character encountering time displayed thereon are changed by the designating operation by means of a mouse as the input device 2 to enable the selection of a new character and position reference table reservedly and to provide for the preparation of another character and position reference table for the selection reservation at a next point of character encountering time (c in FIG. 3). Next, the computer 2a in the user station transmits a character selection reservation request (Request 2 in FIG. 3) while transferring the character and position reference table for the character selection reservation to the game management station 3 (d in FIG. 3). Upon receipt of the character selection reservation request (Request 2 in FIG. 3), the computer 3a in the game management station 3 starts a character selection reservation process by execution of a program (a in FIG. 5) to immediately identify a user identification code relating to a character selection reservation request (Request 2 in FIG. 5) (b in FIG. 5). Then, the computer 3a gets access to the address in the address region assigned to the user information (b in FIG. 18) relating to the user identified by the process in b in FIG. 5, in the user data base (a in FIG. 18) shown in FIG. 18. Within the computer 3a there is read a table of a group of effective characters (c in FIG. 18) relating to a player operating the user station 2A (c in FIG. 5). The table of a group of effective characters read here is collated with a character and position reference table for the character selection reservation already received incidental to the character selection reservation request (Request 2 in FIG. 5) on the basis of the judgement logic on the game rules to judge, for example, whether or not the character and position reference table for the character selection reservation includes characters which are not registered in the table of a group of effective characters, whether or not the number of characters exceed the maximum number in the game rules; whether or not the position of each character is against the position constraints in the game rules; and whether or not the sum total of the weight (SIZE) of a "creature" character described later exceeds the carrying capacity (MAX) of a "vehicle" character described later, to thereby determine whether or not the character selection reservation request (Request 2 in FIG. 5) is reasonable (d in FIG. 5).

Figure 5:
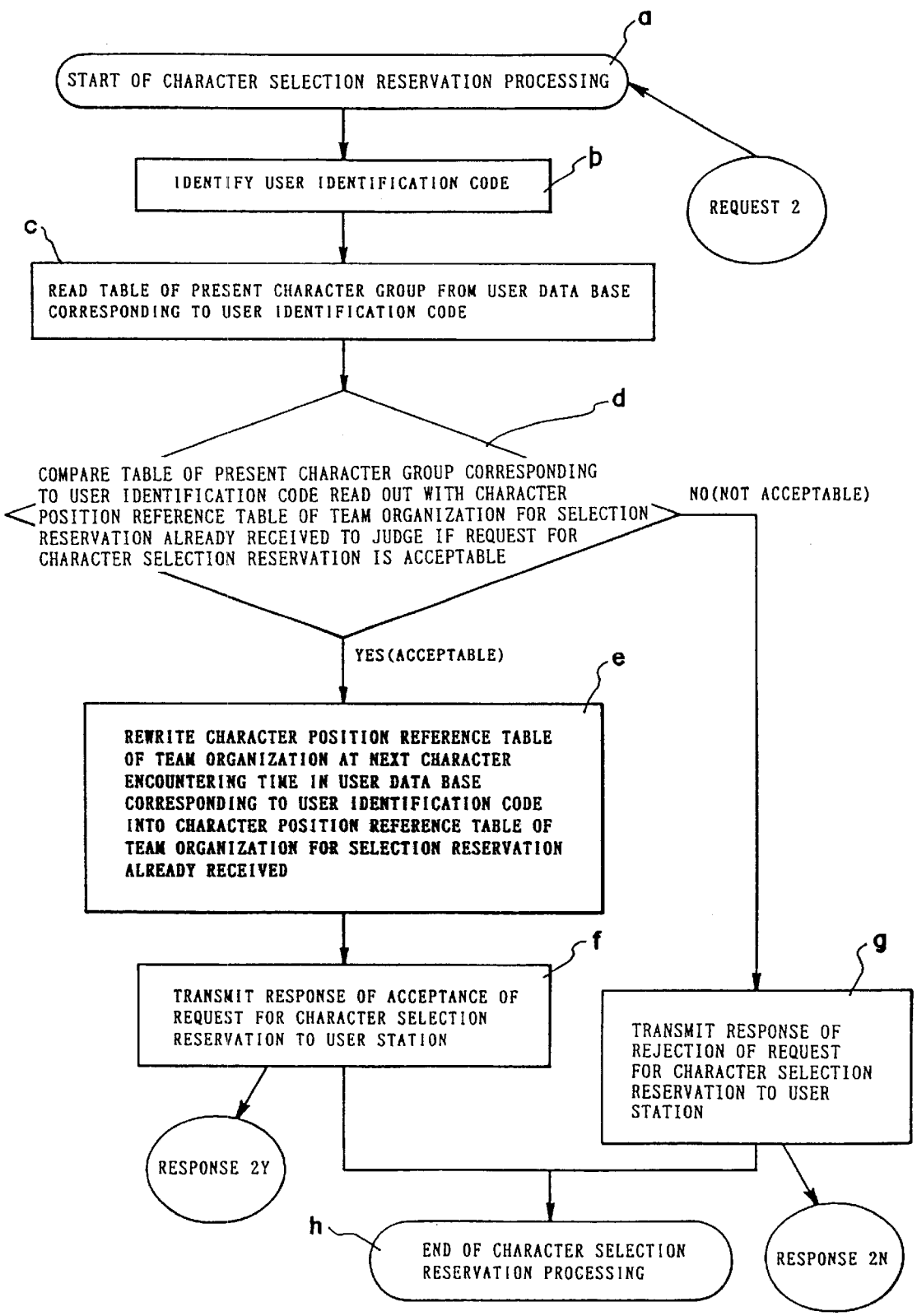
Figure 6:
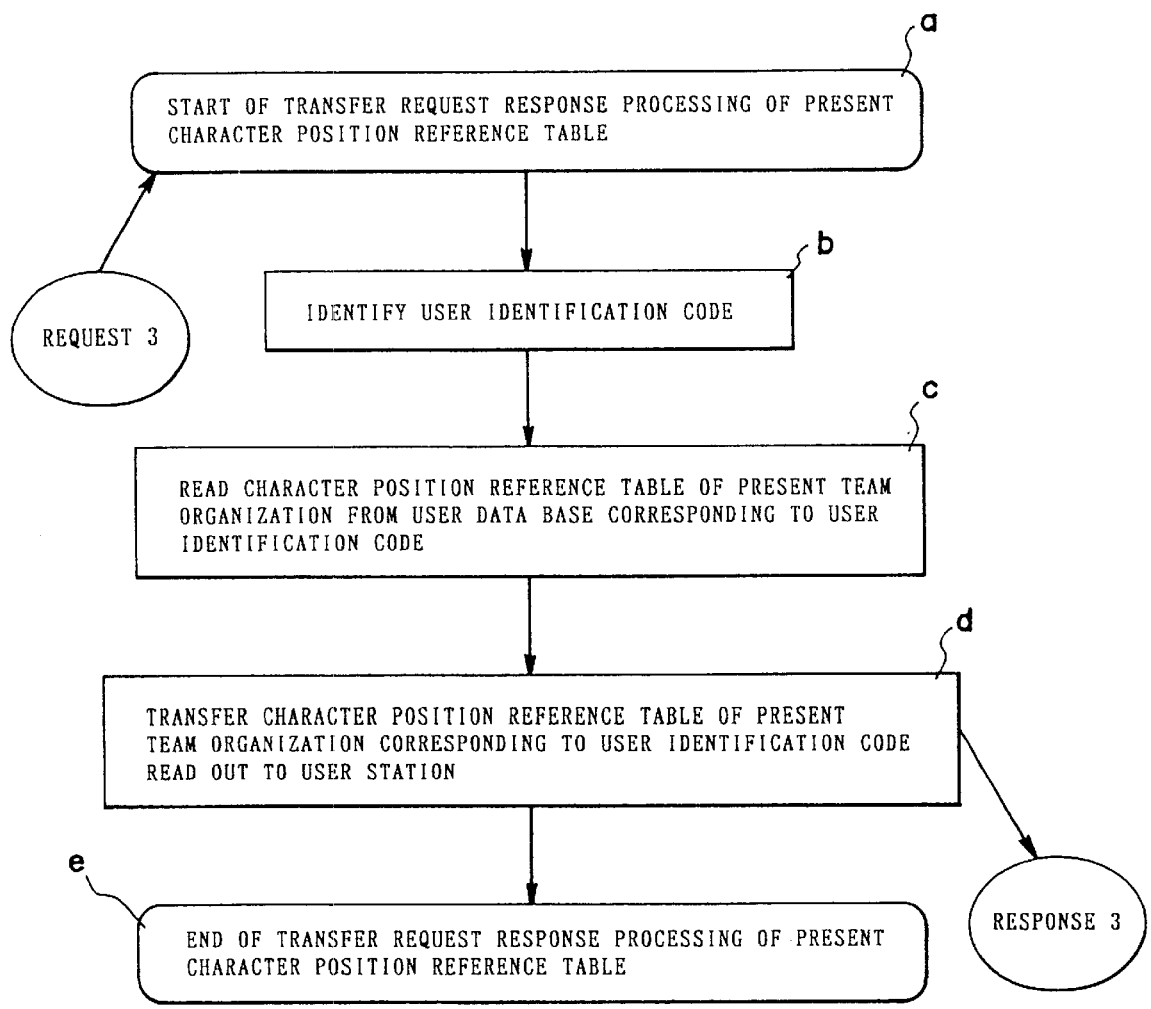

In the case where the result of determination (d in FIG. 5) is "Yes" and the character selection reservation request is reasonable, the computer 3a gets access to the address in the address region assigned to user information (b in FIG. 18) relating to the user, in the user data base (a in FIG. 18), to again read within the computer a character and position reference table for the character and position reference table (d in FIG. 18) reservedly selected as a game element at a next point of character encountering time, and the resulting table is written to a character and position shown in FIG. 5 to update and store it as the character and position reference table (d in FIG. 18) of the address in the user data base (a in FIG. 18) (e in FIG. 5). A response (Response 2Y in FIG. 5) for receipt of a character selection reservation request is transmitted to the user station (f in FIG. 5) to terminate the character selection reservation process (h in FIG. 5). On the other hand, in the case where the result of determination (d in FIG. 5) is "No" and the character selection reservation request is not reasonable, the computer 3a transmits a response (Response 2N in FIG. 5) for rejection of a character selection reservation request to the user station (g in FIG. 5) to terminate the character selection reservation process (h in FIG. 5). The computer 2a in the user station 2A also terminates the character selection reservation process (e in FIG. 3). In this procedure, the computer 2a in the user station 2A executes the process a to e shown in FIG. 3 in accordance with the flow chart shown in FIG. 3, and the computer 3a in the game management station e executes the processes a to e shown in FIG. 4 and a to h shown in FIG. 5 in accordance with the flow chart shown in FIGS. 4 and 5 to thereby realize player character selection reservation means A and opposite player character selection reservation means B in FIG. 1. In the explanation here, attention is paid to the process in one suitable user station out of a plurality of user stations 2A, 2B, . . . 2N so that the process executed thereat is grasped as the character selection reservation process including both the player character selection reservation process and the opposite player character selection reservation process and the opposite player character selection reservation process. In the video game device, according to the present invention, a player for operating a suitable one out of a plurality of user stations generally extensively applies to a number of user stations in pair arrangement each of which is operated by an opposite player for operating a suitable other station out of aplurality of user stations through the single game management station 3 to enable the opposition of a number of pairs of the players and the opposite players. Therefore, one suitable user station operated by a player to whom attention is paid executes the character selection reservation process compatible with the instant player character selection reservation process, while a suitable one other user station operated by a player to whom attention is paid executes the character selection reservation process compatible with the instant opposing player character reservation process.

Incidentally, at a suitable point of time, in the user station, the player can display, on the image plane of the display device 2e, the present character and position reference table selected prior to the execution of the character selection reservation process. In other words, a character and position reference table, in connection with a group of characters organized as one team to actually participate in the battle simulation as the game element at a previous point of character encountering time, is capable of being referred to. In this case, when the player performs the team organizing reference instruction operation by depression of a fixed key on the keyboard as the input device 2 in the user station 2A, the computer 2a of the user station 2A executes the program, whereby the player side executes a series of jobs on the user station side relating to the team organization reference process for referring to the present team organization of characters. In response to the team organization reference operation, the computer 2a starts the team organization reference process (f in FIG. 3) to designate a user identification code for specifying the user station 2A operated by the player, and then, the user station transmits a transfer request (Request 3 in FIG. 3) of the present character and position reference table selected prior to execution of the character selection reservation process to the user station in the network 1 via the network interface 2g (g in FIG. 3). Then, the game management station 3 receives such a transfer request on the network 1 via the network interface 3g, and the computer 3a thereat executes the program to execute a series of jobs on the side of the game management station relating to the team organization reference process. That is, the computer 3a starts the transfer request response process of the present character and position reference table (a in FIG. 6) to immediately identify the user identification code relating to the transfer request (Request 3 in FIG. 6). Next, the computer 3a gains access to the address in the address region assigned to user information (b in FIG. 18) relating to the user identified by the process in b in FIG. 6 to read the present character and position reference table (e in FIG. 18) relating to the player operating the user station 2A to transfer it to the user station 2A designated for responding thereto (d in FIG. 6a, Response 3). The transfer request response process of the present character and position reference table terminates (e in FIG. 6).

On the other hand, the user station 2A receives the Response 3 from the game management station 3, and the computer 2a displays, on the image plane of the display device 2e, the character and position reference table for specifying the present team organization transferred thereto. In other words, the team organization after the previous point of character encountering time (h in FIG. 3) to terminate the team organization reference process (i in FIG. 3) is provided.

The process here is executed simultaneously at a suitable point in time in another suitable user station operated by an opposite player and in the one suitable user station operated by the player, similar to the case of the character selection reservation process previously described. Then, when in the user station 2A, a player operating the same performs a search route setting a reservation instruction as a character encountering event candidate reservation operation at a suitable point of time, the computer 2a in the user station 2A executes a program to thereby execute a series of jobs on the user station side relating to the search route setting reservation operation as the character encountering event candidate reservation operation with respect to the characters of one team on the player side. That is, the computer 2a starts the search route setting reservation process in response to the search route setting reservation instruction operation by depression of a fixed key on the keyboard as the input device 2d (a in FIG. 7) to designate a user identification code for specifying the user station 2A operated by the player and for reserving an own character encountering event candidate. That is, the computer 2a places on the network 1 via the network interface 2g a transfer request (Request 4 in FIG. 7) by which a background route and a present spot occupied by a player's own team of characters on one of the nodes forming the search route are requested to be transferred from the game management station to the player's own user station. Then, when the game management station 3 receives such a transfer request on the network 1 via the network interface 3g, the computer 3a executes a program to thereby execute a series of jobs on the side of the game management station relating to the search route setting reservation process. That is, the computer 3a starts the transfer request response process for a background map, a background route, a search route, and a present spot (a in FIG. 8) and immediately identifies a user identification code of the user station relating to the transfer request (Request 4 in FIG. 8) (b in FIG. 8). Next, the computer 3a first gets access to the specific address region of a background map information data base (f in FIG. 18) common to all user stations shown in FIG. 18 irrespective of the result of identification of the user identification of the user identification code so that when the player operating the user station 2A sets and reserves as described later a route on which a player's own team of characters advances to trace it, the computer 3a reads out the background route information (g in FIG. 18) capable of being an object for setting and reservation, and background map information (h in FIG. 18) on which said background route is superimposed and depicted (c in FIG. 8). In this case, the background route information (g in FIG. 18) is constituted by a list of all nodes on the route connected to respective nodes A, B, C, . . . as shown in g1 to g4 in FIG. 18, for example. The computer 3a further gets access to the address in the address region assigned to the user identified (b in FIG. 18) so that it reads the present search route (i in FIG. 18) by the player of the user station 2A, and the present spot (j in FIG. 18) of one team of characters for the player on the search route (d in FIG. 8) to transfer and respond them under the designation of the user station 2A (e in FIG. 8, Response 4). Next, there is terminated the transfer request response process of the background map, the background route, the search route, and the present spot (f in FIG. 8). On the other hand, in the user station 2A, the computer 2a combines, upon receipt of the response 4 from the game management station 3, the background map, the background route, the search route, and the present spot transmitted thereto to integrate them into one map, and displays them on the image lane of the display device 2e (d in FIG. 7), and further in response to the search route setting reservation operation by means of a mouse as an input device 2d, the computer 2a depicts a new search route in accordance with the node designation on the fixedly settable background route superimposed and depicted on the background map displayed on the display device to thereby perform setting and reservation of a new search route (e in FIG. 7). Next, the computer 2a designates the user identification code of the user station 2A, and then transmits a new search route updated by the search route setting reservation process and a setting request for a new search route (Request 5 in FIG. 7) to the game management station 3 via the network 1 (f in FIG. 7). Then, the game management station 3 receives such a setting request, and the computer 3a executes a program to execute a series of jobs on the side of the game management station 3 relating to the new search route setting request response process. That is, the computer 3a starts the new search route setting request response process (a in FIG. 9), and then identifies the user identification code relating to the new search route setting request (Request 5 in FIG. 9) (b in FIG. 9), after which it jumps to a sub-routine process to judge whether or not a search route newly set is reasonably established in the light of the route logic constraints (c in FIG. 9). In the case where the result of judgement is "Yes", and the search route newly set is reasonably established in the light of the route logic constraints, the computer 3a gets access to the address in the address region assigned to user information (b in FIG. 18) relating to the user identified by the processing shown in b of FIG. 9 to store and update a route node connection table (i in FIG. 18) which defines the new search route relating to the search route setting reservation operation in the user station 2A (d in FIG. 9). The computer 3a then immediately transfers the route node connection table (i in FIG. 18) which defines the new search route to be stored and updated under the designation of the user station 2A to thereby respond thereto (Response 5, in e in FIG. 9), thus terminating the new search route setting request response process (f in FIG. 9).

Figure 9:
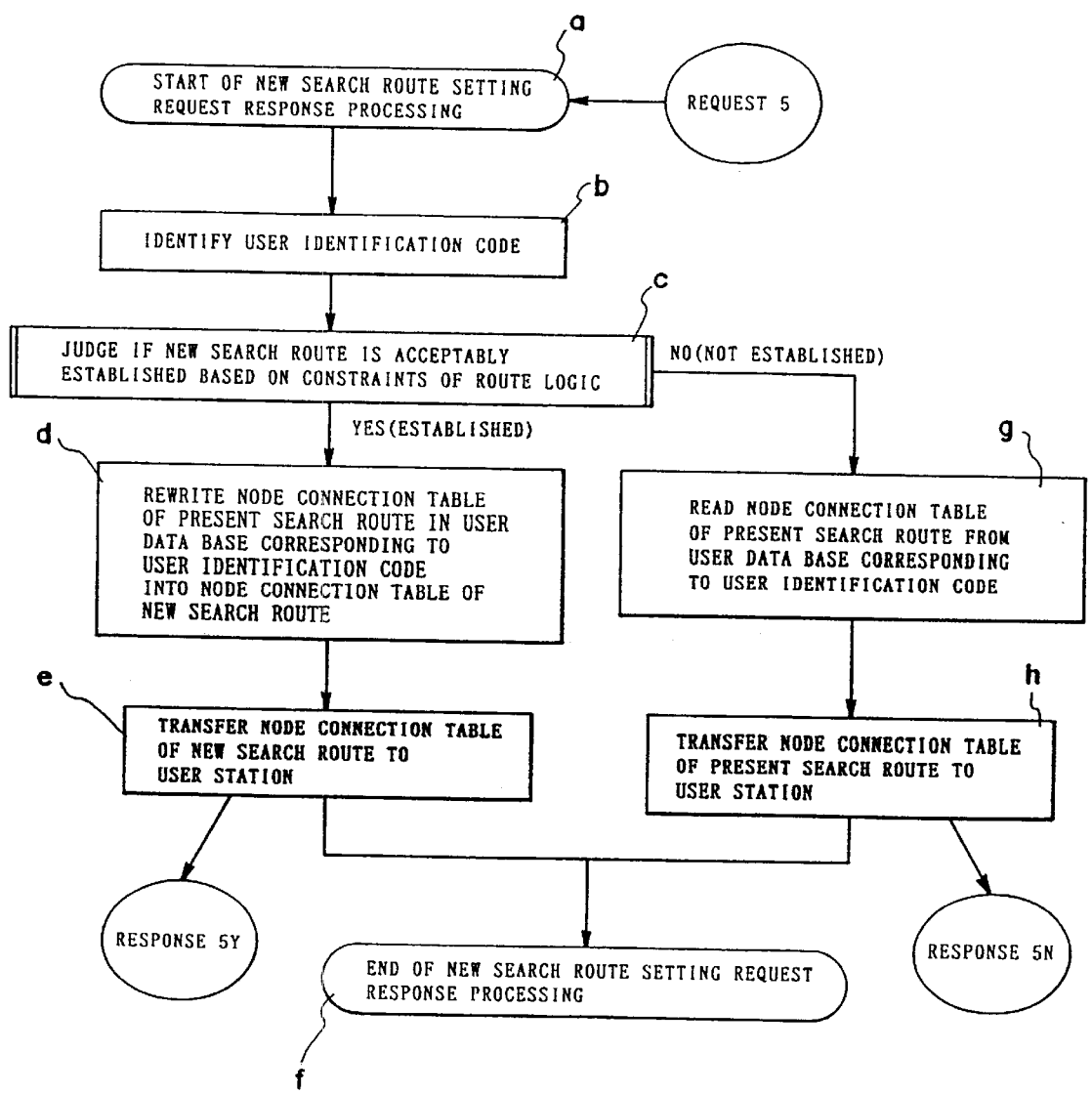
Figure 10:
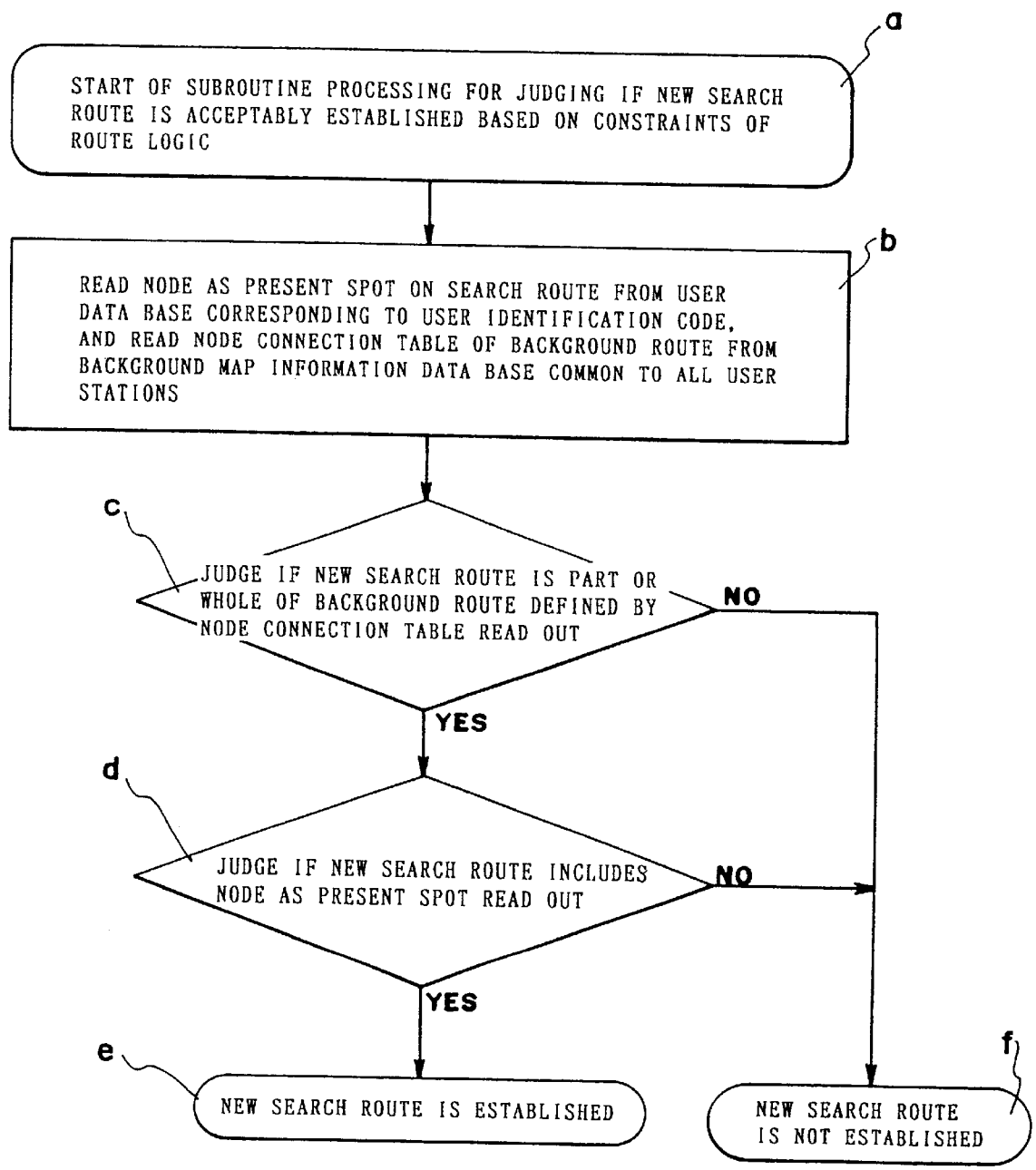

On the other hand, in the case where the judgment result of the sub-routine process (c in FIG. 9) is "No", and a search route to be set newly is not reasonably established in the light of the route logic constraints, the computer 3a gets, in the user data base shown in FIG. 18 (a in FIG. 18), access to an address in an address region assigned to user information (b in FIG. 18) relating to the user identified by the process b shown in FIG. 9, to read a route node connection table (i in FIG. 18) presently stored in the user station 2A, in other words, a route node connection table which defines a search route relating to the previous search route setting reservation operation in the user station 2A (g in FIG. 9), and the read table is transferred under the designation of the user station 2A as a response thereto (h in FIG. 9, Response 5). Thereby, the new search route setting request response process terminates (f in FIG. 9). In a series of processes on the game management station 3 side relating to the new search route setting request response process, the computer 3a having jumped to the sub-routine process c shown in FIG. 9, first starts the sub-routine process for the judgement of success or failure of a new route, that is, the judgement whether or not the new search route is reasonably established in the light of the route logic constraints (a in FIG. 10) and gets access to an address by the process b shown in FIG. 9 to read a present route of a team of characters relating to the search route setting reservation operation in the user station 2A and described later, that is, a node presently occupied by one team of player characters selected by the player character selection reservation instruction operation in the user station 2A (j in FIG. 18). This sub-routine further involves getting access to the address region of a background map information data base (f in FIG. 18) common to all the user stations to read a node connection table of a background route as the background route information (g in FIG. 18) to be an object for setting reservation according to the search route setting reservation instruction operation in the user station 2A (b in FIG. 10). Then, the computer 3a judges if a new search route is a part or the whole of the subject background route read in the process of FIG. 10b (c in FIG. 10). If the judgement result is "Yes" and the new search route is a part or the whole of the subject background route, the computer 3a judges if the new search route includes a present node of the character team read in the process b in FIG. 10 (d in FIG. 10). If the judgement result is "Yes", the new search route is established reasonably in the light of the route logic constraints (e in FIG. 10). The computer 3a terminates the sub-routine process and proceeds to the process d in FIG. 9. On the other hand, even if the judgement result of process c in FIG. 10 is "No", and the new search route is not a part or the whole of the subject background route, and even if the judgement result is "No", and the new search route does not include a present node of the character team, the new search route is not established reasonably in light of the route logic constraints (f in FIG. 10). The computer 3a terminates the sub-routine and proceeds to the process g in FIG. 9.

Then, a series of new search route setting request response processes on the side of the game management station is terminated. The computer 2a which receives the response during the time (response 5Y5N in FIG. 9) via the network 1 further receives and processes a route node connection table defining a new search route or a route node connection table defining a search route relating to the previous route setting reservation operation (g in FIG. 7), displays a new search route received and processed thereat or the previous search route on the image plane of the display device 2e (h in FIG. 7), and terminates the search route setting reservation process (i in FIG. 7).

Figure 1:
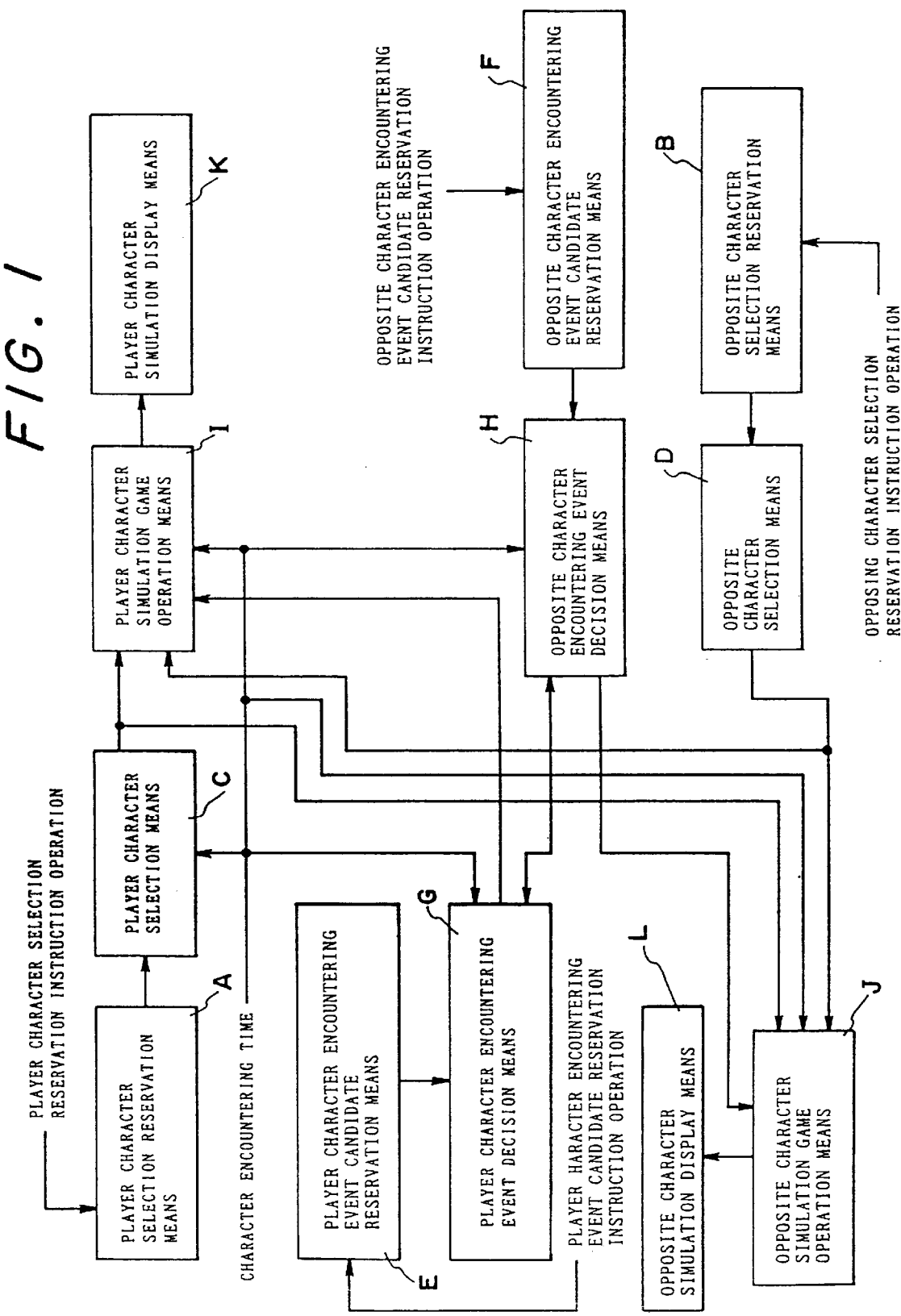
FIG. 1 is a functional block diagram (corresponding to claims) according to this invention.
Figure 7:
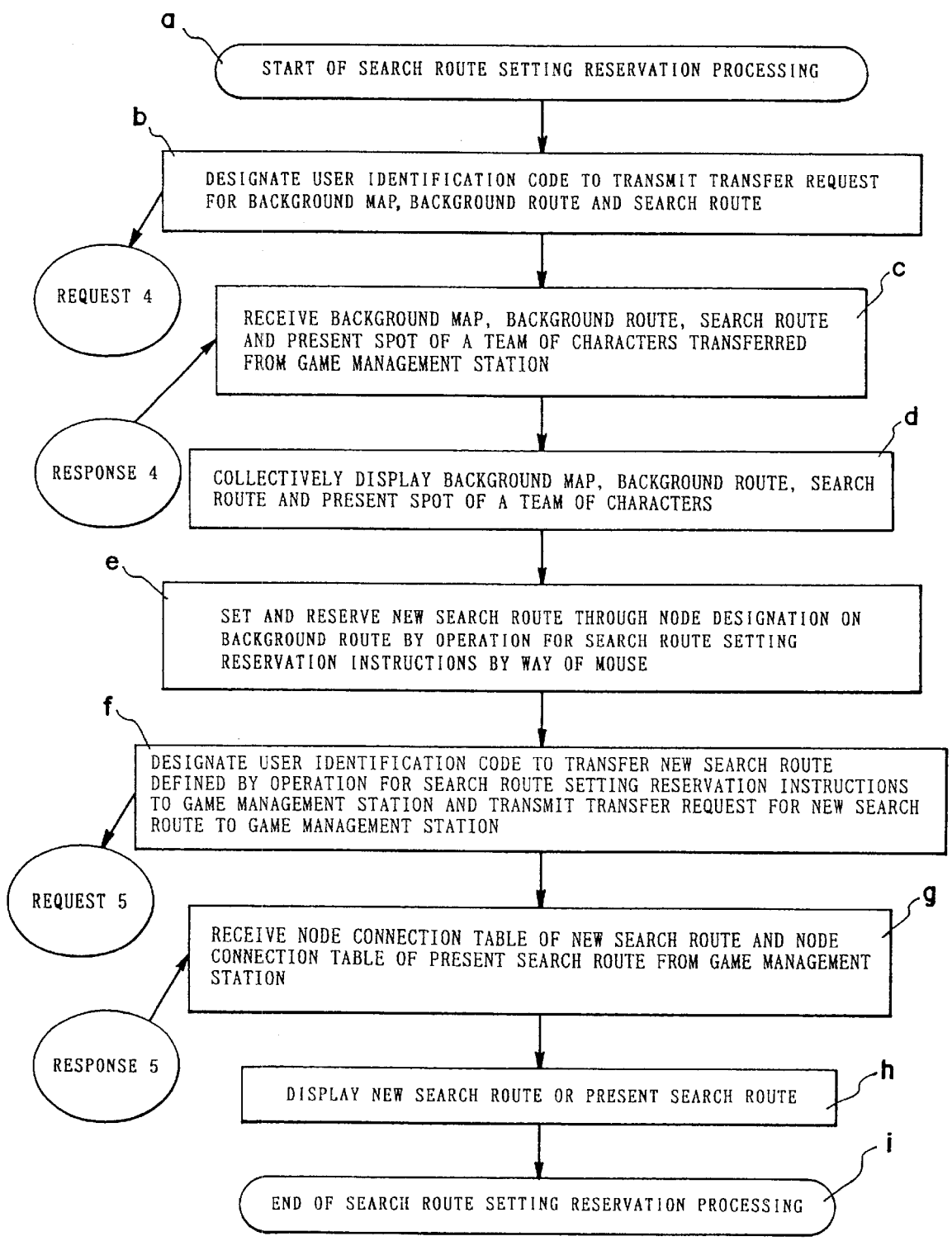
Figure 8:
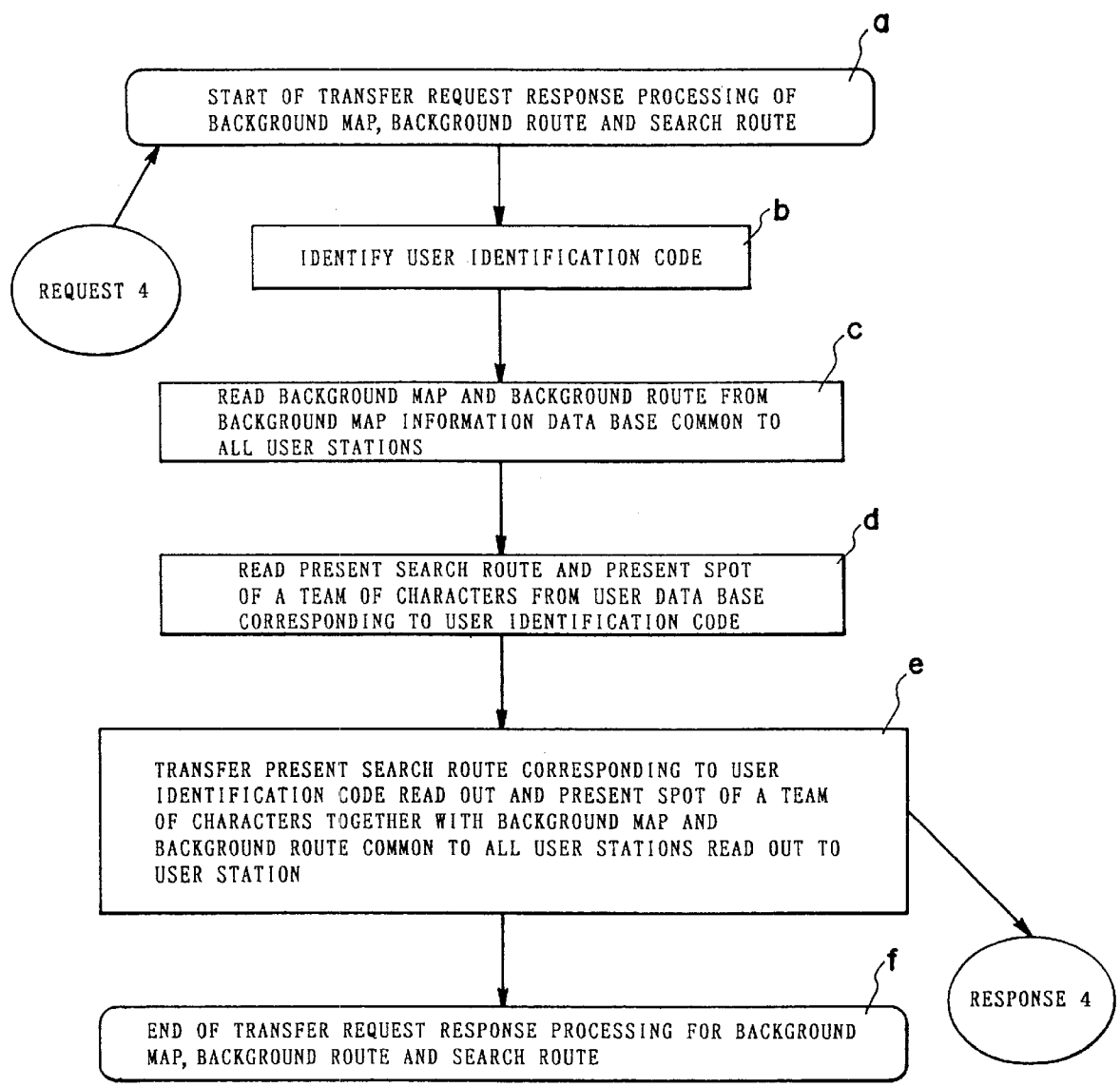

In a manner as described above, the computer 2a in the user station 2A executes various processes shown in FIG. 7 in accordance with the flowchart of FIG. 7, and the computer 3a in the game management station 3 executes various processes shown in FIGS. 8, 9 and 10 in accordance with the flowcharts of FIGS. 8, 9 and 10 to thereby realize player character encountering event candidate reservation means E shown in FIG. 1. In the video game device of the present invention, a player operating a suitable one out of a plurality of user stations is opposed to an opposite player operating another suitable user station out of a plurality of user stations through a single game management station 3, and therefore, with respect to the other suitable user station, opposite character encountering event candidate reservation means F is realized by the execution of equivalent program processes in similar fashion to the case of player character selection reservation means already described.

A periodical process executed every fixed period of time as a character encountering period in the computer 3a in the game management station 3 now will be described. The periodical process executed every fixed period of time termed herein is a periodical process executed every character encountering time appearing every character encounter period fixedly or variably preset during a period of game time. Therefore, the execution of such a periodical process is realized in software within the computer 3a, or is started such that the computer 3a begins to operate a program in response to the start instructions every fixed period of time as a character encountering period defined by a period settable timer 3h mounted in hardware outside the computer 3a.

Figure 11:
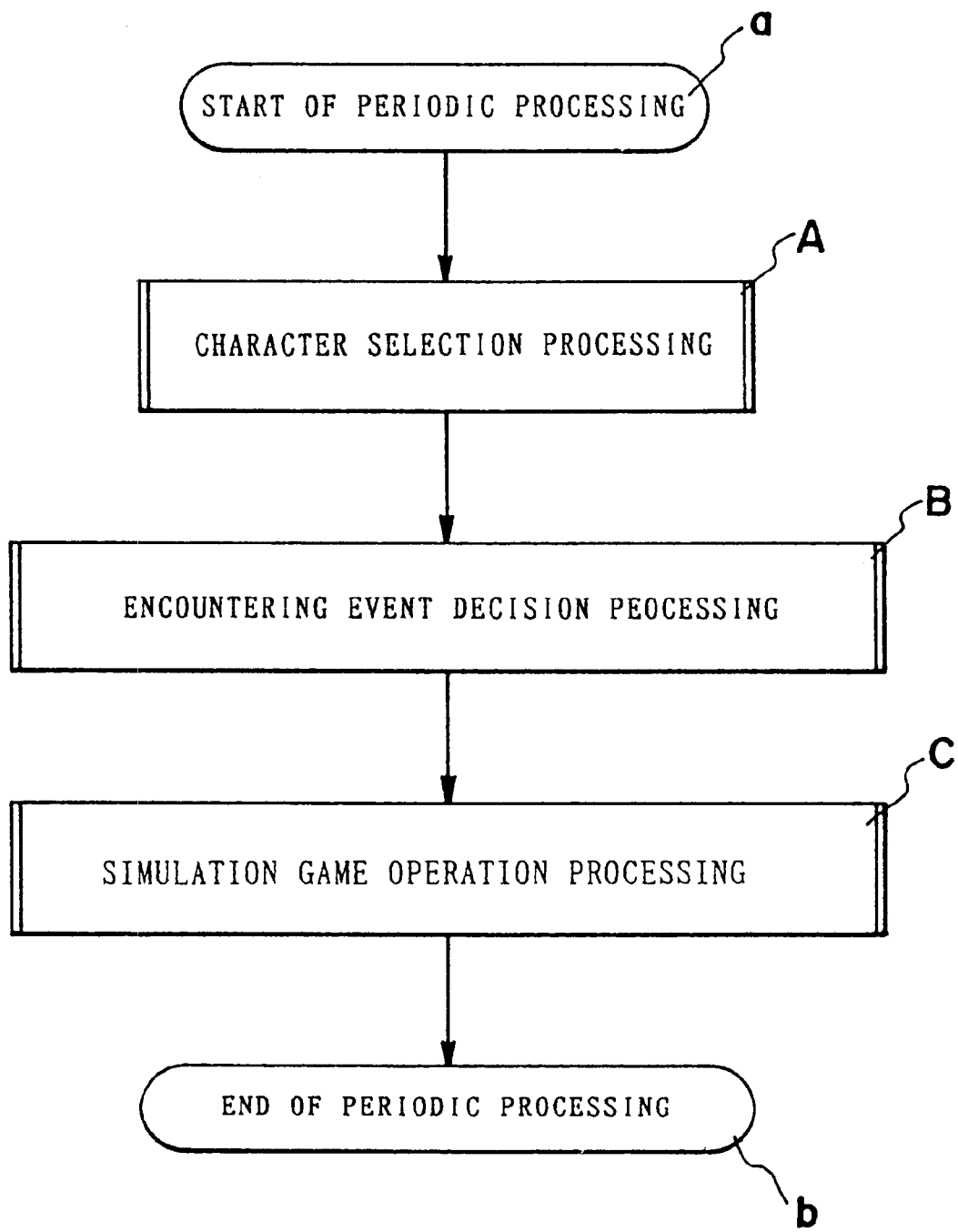
Figure 12:
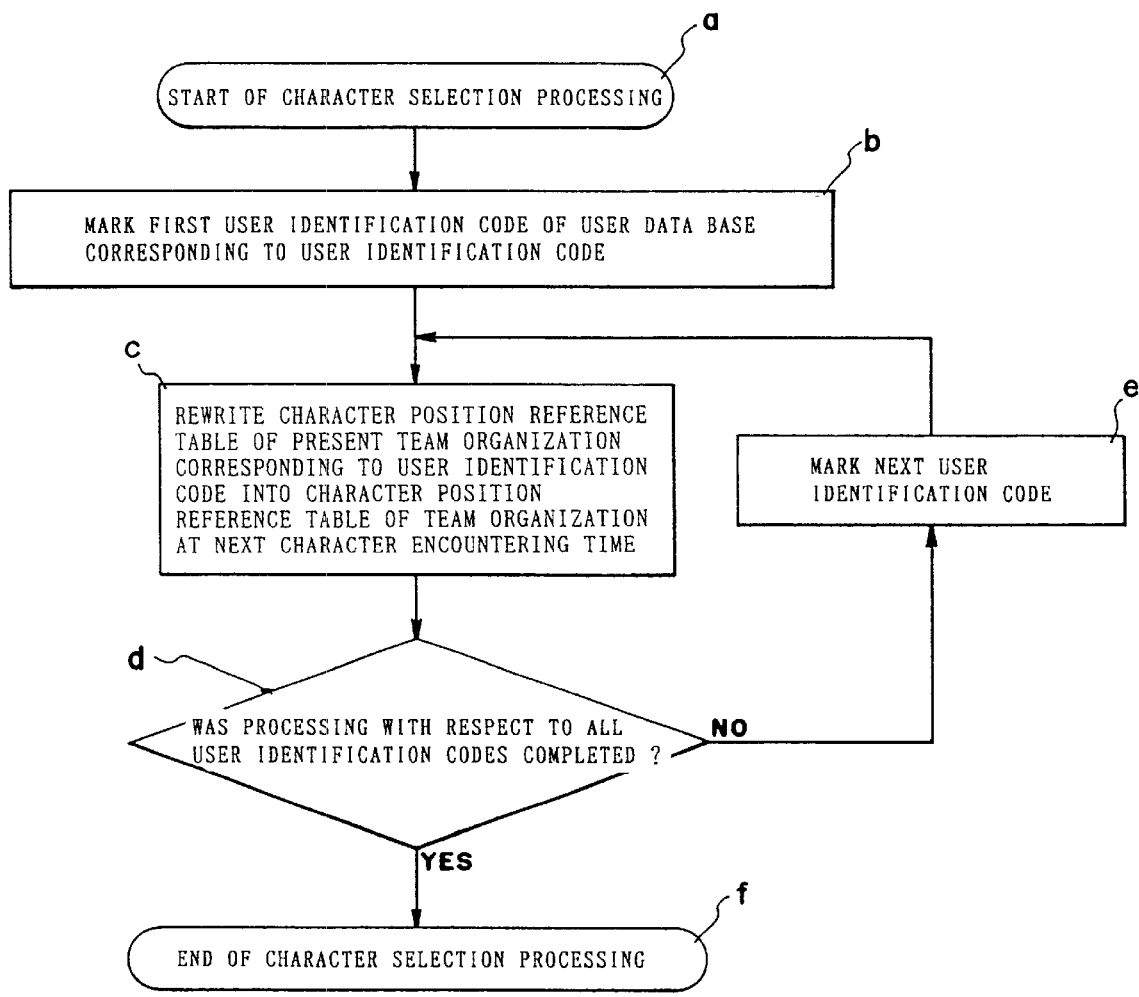

FIG. 11 shows a flowchart of a frame of such periodical processes. The computer 3a which started a periodical process (A in FIG. 11) executes a character selection process for realizing player character selection means C and opposite character selection means D shown in FIG. 1, then executes an encountering event decision process for realizing player character encountering event decision means G and opposite character encountering event decision means H shown in FIG. 1 (B in FIG. 11), and executes a simulation game operation process for realizing player character simulation game operation means I and opposite character simulation game operation means J (c in FIG. 11) to terminate the periodical processes (B in FIG. 11).

In the aforementioned periodical process (A in FIG. 11), the computer 3a which started the character selection process (a in FIG. 12) first pays attention to an identification code of the first user station (b in FIG. 12) in an attempt to sequentially execute processes with respect to all the user stations. In other words, with respect to all the user identification codes for separately specifying all the user stations, the first inputting user station gets access to an address in an address region assigned to user information (b in FIG. 18) relating to the user station of the user identification code to which attention is paid in the user data base shown in FIG. 18 (a in FIG. 18) to read a character and position reference table for character reservation in the user station 2A, that is, the generation of a character and position reference table (d in FIG. 18) for the next character encountering time. This process further involves gaining access to a separate address in an address region assigned to user information (b in FIG. 18) relating to the same user station to rewrite, update and store the present character and position reference table in the user station stored therein. The computer 3a pays attention to the next user identification code while sequentially advancing on the user identification code (e in FIG. 12) till the updating and storing process of the character and position reference table as described above is executed to completion (d in FIG. 12), and terminates the character selection process (f in FIG. 12) when the updating and storing process execution is finished with respect to all the user identification codes.

In the note advancing process during the encountering event decision process (B in FIG. 11), the computer 3a, which started the node advancing process, first pays attention to a user identification code of the first user station (b in FIG. 13) in an attempt to sequentially process all the identification codes for separately specifying all the user stations 3a gains computer access to an address in an address region assigned to user information (b in FIG. 18) relating to the user station of the user identification code to which attention is paid in the user data base (a in FIG. 18) shown in FIG. 18. In this way, the present search route (i in FIG. 18) is read by the search route setting reservation instruction operation as the character encountering event candidate reservation instruction operation in the user station 2A and a node at the present spot (j in FIG. 18) on the present search route (i in FIG. 18) for one team of characters relating to the user station 2A. The computer 3a then updates and stores the first node of the search route (i in FIG. 18) as a node at the present spot (j in FIG. 18) (c in FIG. 13).

Figure 13:
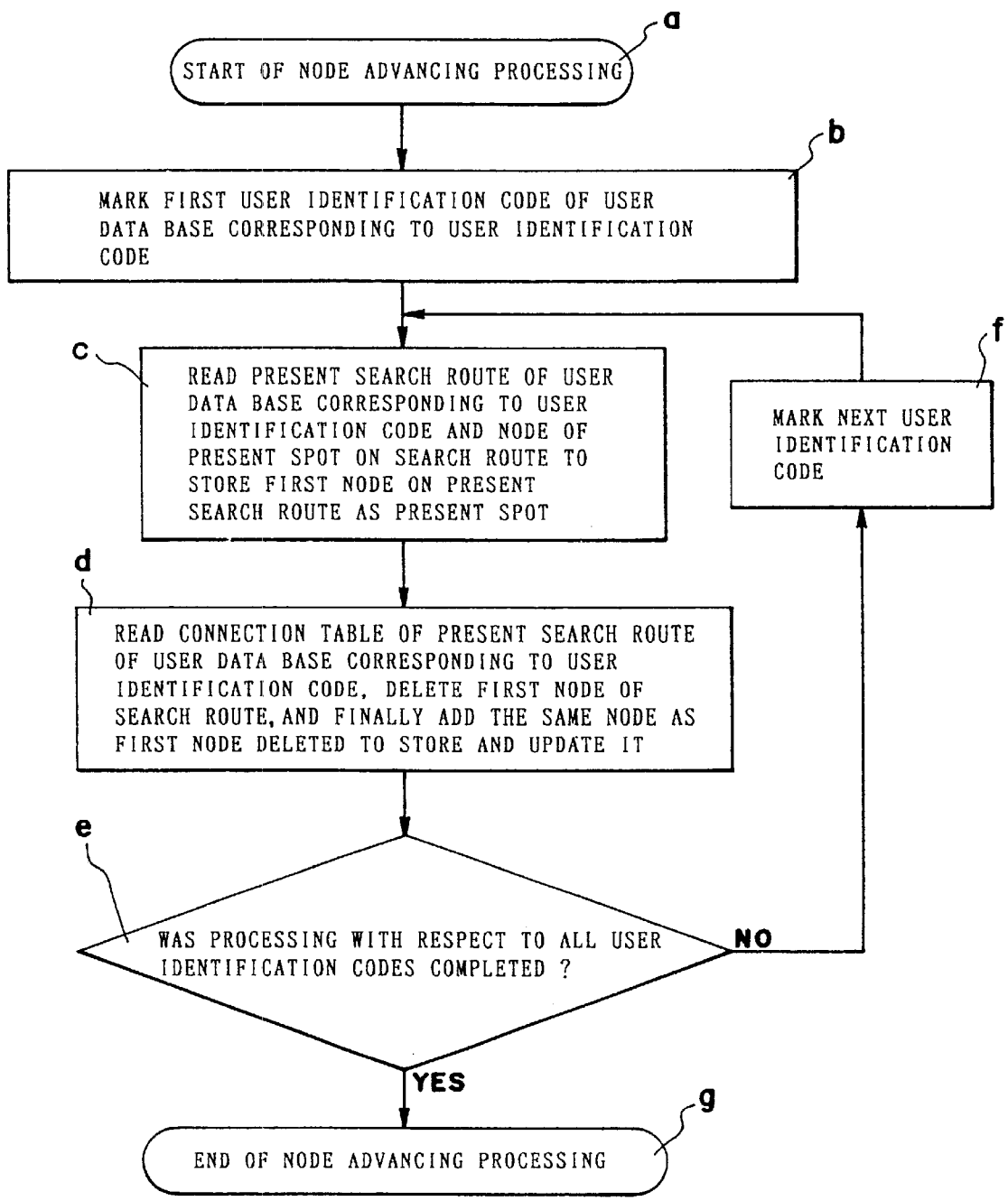

Then, the computer 3a executes a circular advancing process in which the node connection table of the search route (i in FIG. 18) is read, the first node on the route is deleted, and the same node as the first node deleted is added to one end to store and update the node connection table (i in FIG. 18) of the search route accompanied by the first node for specifying the present spot in the next periodical processes (d in FIG. 13). The computer 3a pays attention to the next user identification code while sequentially advancing the user identification codes (f in FIG. 13) till the updating and storing process of the node connection table (i in FIG. 18) of the present search route as described and the updating and storing process of a node at the present spot (j in FIG. 18) on the route are executed to finish (e in FIG. 13). The computer then terminates the node advancing process (g in FIG. 13) when the updating and storing process is executed to with respect to all the user identification codes (g in FIG. 13).

In the character encountering process during the encountering event decision process (B in FIG. 11), the computer 3a sequentially gets access to an address in an address region assigned to user information (b in FIG. 18) to read a node at the present spot (j in FIG. 18) on the present search route (i in FIG. 18) with respect to all the identification codes for separately specifying the user stations, and lists or brings up the user identification codes of the user stations occupying each node at the present spot to read the present character and position reference table (e in FIG. 18) corresponding to the user identification codes listed or brought up to prepare an inverted file. Accordingly, there can be retrieved from each node of the present spot (j in FIG. 18) the present character and position reference table (e in FIG. 18) occupying the node at that spot and there is specified a pair of character and position reference tables for a pair of character teams occupying the node at the present spot.

Therefore, the computer 3a, which started the character encountering process (a in FIG. 14) gets access to an address region of a background map information data base (f in FIG. 18) common to all the user stations in advance to read a specific background route information (g in FIG. 18) to be an object for search route setting reservation. The computer 3a then sequentially executes the process for every node on the background route with respect to all the nodes (b in FIG. 14). At that time, first, with respect to a node to which attention is first paid on the background route, the present character and position reference table (e in FIG. 18) occupying the node as a node at the present spot is retrieved by means of the inverted file to list or bring up all the character and position reference tables (e in FIG. 18) as described. Next, the computer 3a judges if the character and position reference tables listed or brought up by the process (c in FIG. 14) are two, that is, not less than a pair of teams (d in FIG. 14). In the case where the judgement result is "No" and there is not reached a pair of teams, opposition is impossible in the game. Therefore, the node to which attention is paid on the background route is advanced, and the processing with respect to the next node (e in FIG. 14) is executed (b in FIG. 14). On the other hand, in the case where the judgement result (d in FIG. 14) is "Yes", and opposition of a pair of teams is possible, i.e., two character and position reference tables for a pair of teams, are selected by means of the random number process from all of the character and position reference tables (e in FIG. 18) occupying the node to which attention is paid as the node at the present spot. The thus selected two character and position reference tables are erased from the character and position reference tables listed or brought up which are retrieved from the inverted file (f in FIG. 14) whereby two character and position reference tables or more are listed or brought up. This is true even in the case where more than two or a pair of the character and position reference tables for a pair of teams are sequentially selected many times through succeeding passes thereafter to ensure the proper processing.

Figure 14:
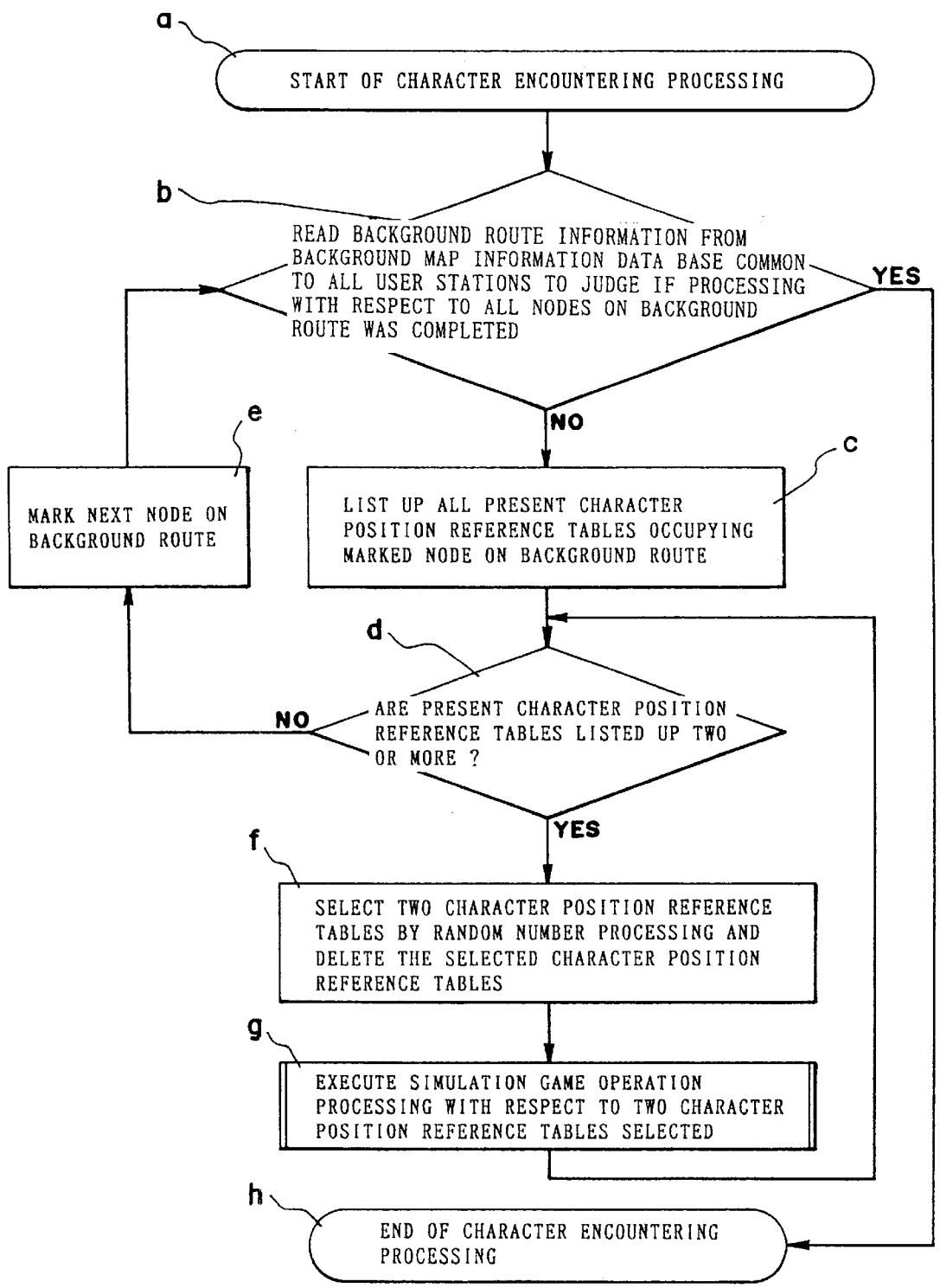
Figure 15:
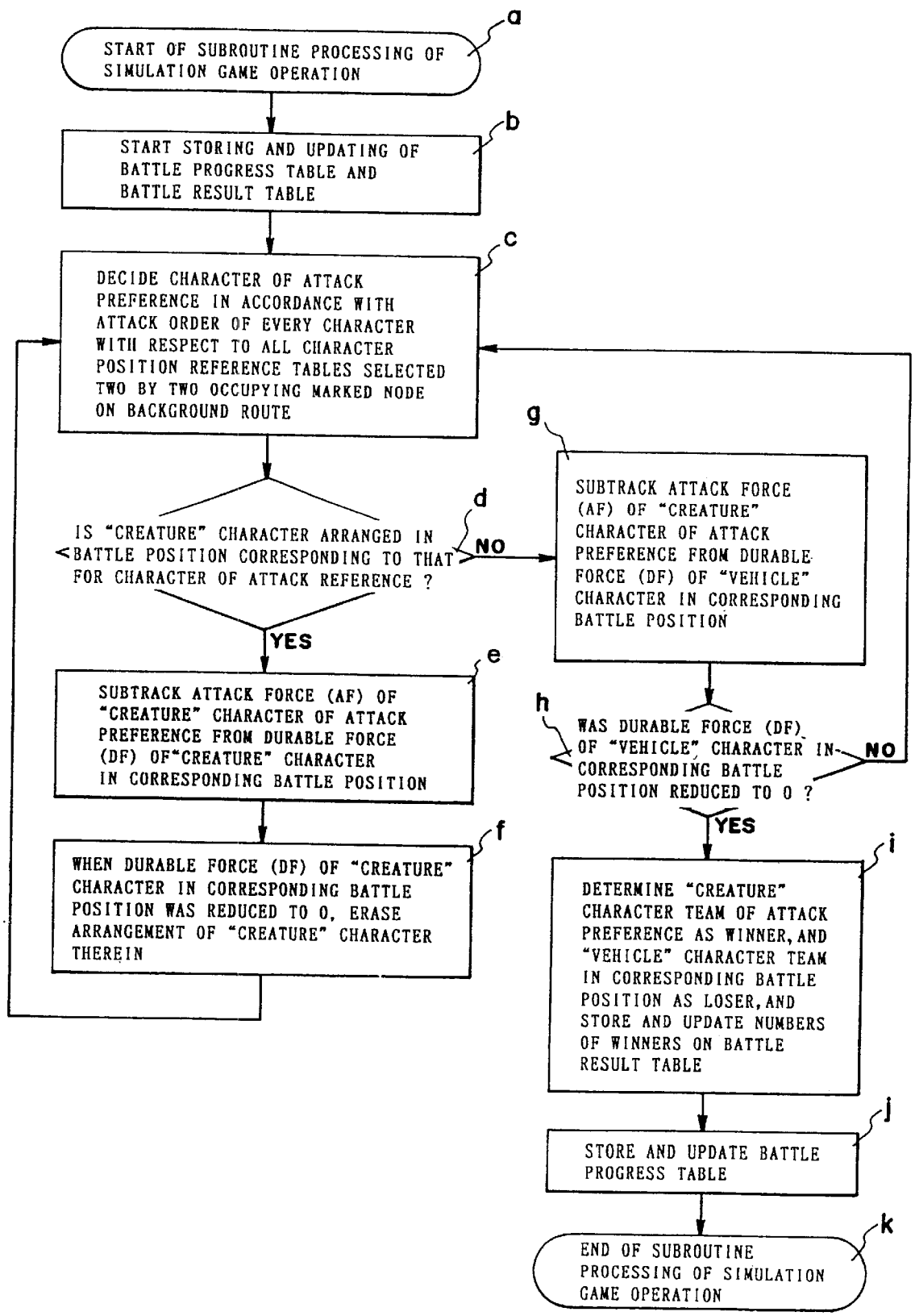

The computer 3a having executed a series of character encountering processes (a to f in FIG. 14) as described above shifts to the simulation game operation process (g in FIG. 14) and jumps to the sub-routine process shown in FIG. 15.

In the above-described explanation, attention is paid to the process in one suitable user station out of a plurality of user stations 2A, 2B . . . 2N, and the process executed thereat is grasped as the character selection process including both the player character selection process and the opposite character selection process, and similarly the process executed thereat is grasped as the character encountering event decision process and the opposite character encountering event decision process. However, in similar fashion to the case of the character selection reservation process, in the video game device according to the present invention, a suitable one out of a plurality of user stations is opposed to another suitable one out of a plurality of user stations through a single game management station 3. Therefore, with respect to the equal character selection process, in a suitable one of the user stations to which attention is paid, there is executed the player character selection process, whereas in another suitable one of the user stations to which attention is paid, there is executed the opposite character selection process. Further, similarly, with respect to the equal character encountering event decision process, in a suitable one of the user stations to which attention is paid, there is executed the player character encountering event decision process, whereas in another suitable one of the user stations to which attention is paid, there is executed the opposite character encountering event decision process. Accordingly, incidentally, in the node advancing process in the player character event decision process (B in FIG. 11), a search route (stored in a fixed region in i in FIG. 18) on which one team of characters selected with respect to a suitable one of the user station is advanced for every point of character encountering time with a clocking of the periodical process to enable tracing. A search route (stored in another region in i in FIG. 18) on which another team of characters selected with respect to the suitable other one of the user stations has advanced every point of character encountering time to trace separately the route for the other suitable user station, although both search routes are depicted together on the same background route (g in FIG. 18). That is, the nodes on one search and those on another search route are respectively advanced one by one for every character encountering time. In the character encountering process in the encountering event decision process (B in FIG. 11), the unexpected encountering events at the nodes on separate background routes (g in FIG. 18) with respect to separate teams of characters which all together advance on the nodes one by one every point of character encountering time under the node advancing process occur simultaneously with respect to each node on separate background routes every point of character encountering time. Incidentally, when attention is paid to a suitable one out of aplurality of user stations, FIG. 19 illustrates a display image plane (d in FIG. 7) on which a display device in the user station collectively displays a background map A common to the user stations, a background route B common to the user stations superposedly depicted on the background map, a search route C properly selected by every user station as a part or the whole of the background route, and a node D at the present spot of 14 station as a part or the whole of the background route, and a node D at the present spot of 14 teams of characters relating to the user station in order to carry out the search route setting reservation process in response to the search route setting reservation instruction operation as the player character event candidate reservation instruction operation by means of a mouse or the like. On the other hand, when attention is paid to a suitable other user station out of a plurality of user stations, FIG. 20 illustrates a display image plane on which a display device in the user station collectively displays a background map A common to the user stations, a background route B common to the user stations superposedly depicted on the background, a search route Cx properly selected user station as a part or the whole of the background route, and a node Dx at the present spot of 14 teams of characters relating to the user station.

According to the display image lane of FIG. 19, on the background route expressed by the connecting relations among separate nodes in a group of 40 nodes discriminated by nodes 1 to 40, the selection, as a search route, of a look-like portion designated by the connecting relations of node 20-node 21-node 22-node 27-node 32-node 31-node 30-node 25-node 26-node 20 are shown by the bold line in the figure. Similarly, according to the display image plane of FIG. 20, on the same background route as that mentioned above, the selection, as another search route, of a loop-like portion designated by the connecting relations of node 17-node 23-node 22-node 21-node 20-node 16-node 11-node 7-node 12-node 17 are shown by the bold line in the figure. On the assumption of the common background map, the common background route, and the separate search routes as described above, in the node advancing process, the present spot of one team of characters relating to the user station advances on each node on one search route every character encountering time from a start spot suitably designated, for example, from the node 20 so as to depict a loop, for example, a loop of node 20-node 21-node 22 in designated order on one search route on the display image plane of FIG. 19. Meanwhile, simultaneously, the present spot of another team of characters relating to the user station advances on each node on another search route every character encountering time from a start spot suitably designated, for example, from the node 17 so as to depict a loop, for example, a loop of node 17-node 23-node 22 in designated order on another search route on the display image plane of FIG. 20. Accordingly, in this example of operation, the present spot of each team of characters reach the common node 22 on the separate search routes on the display image plan of FIG. 19 as well as the display image plane of FIG. 20 at the third advance from the start spot, that is, at the third point of character encountering time, whereby at that character encountering time, two teams of characters are opposed on the node 22 of the respective search routes. At that time, in separate user stations other than the above two stations out of a plurality of user stations, the same present spot on the node 22 of other search routes may be occupied by other teams of characters in other user stations. In this case, however, two opposed teams are selected from three teams by the random number process as previously mentioned.

Continuously, in the above-described simulation game operation process (c in FIG. 11), with respect to the character and position reference table (f in FIG. 14) for a pair of teams selected by means of the random number process to be opposed in a character encountering event, in other words, with respect to two teams of characters opposed on one node coincided with each other on two search routes set separately on the background route, the following simulation game operation process is executed by the above-mentioned character encountering process. That is, the computer 3$a$ having started the simulation game operation process (a in FIG. 15) first sequentially gets access to the address in an address region assigned to user information (b in FIG. 18) relating to user stations of separate user identification codes in the user data base (a in FIG. 18) in order to sequentially execute the process with respect to all the user identification codes for separately specifying all the user stations, similar to the case of the character selection process (A in FIG. 11, and b, d, and e in FIG. 12) to read a battle progress table (k in FIG. 18) and a battle result table (1 in FIG. 18) with respect to the separate user identification codes and starts the memory updating process (b in FIG. 15). A pair of character and position reference tables (e in FIG. 18) for a pair of teams selected and opposed are read by the process in f in FIG. 14 during the character encountering process, and the attack preference characters are decided in accordance with the attack order of every character (c in FIG. 15).

Incidentally, the position and character reference table (e in FIG. 18) for specifying the organization of the present team of characters stored in the user data base (a in FIG. 18) corresponding to the user identification code in each user station is constituted, for example, as shown in e1 of FIG. 18. That is, in e1 of FIG. 18, one "vehicle" character is characterized by the maximum character carrying capacity (MAX) and the durable force (HP), and eight "creature" characters other than the "vehicle" character as described are characterized by the weight (SIZE), the durable force (HP), the attack force (AP) and the quickness (AGI) as the attack order. The "creature" characters up to 8 are carried on one "vehicle" character under the limitation that the total weight (SIZE) of the 8 "creature" characters does not exceed the maximum character carrying capacity (MAX) of the "vehicle" character. In this case, the 8 "creature" characters occupy, as battle positions, positions of "left-upper", "upper", "right-upper", "left", "right", "left-lower", "lower", and "right-lower" which are three plane arrangements (positions) per side so as to surround one "vehicle" character which occupies a center position as shown in FIG. 21. The constitution of the character and position reference table as described is similar for the present character and position reference table (d in FIG. 18) being reserved to be the present character and position reference table (e in FIG. 18) at the next point of character encountering time, which is constituted as shown in d1 in FIG. 18, for example. Incidentally, there is illustrated here the state in which with respect to the battle positions of "left-upper", "right-upper", "right", "left-lower", and "right-lower", the replacement of characters is being ensured by the character selection reservation process. The "creature" characters and the "vehicle" character selected in the character and position reference tables (e1 in FIG. 18 and d1 in FIG. 18) as described are transcribed to the character and position reference tables (e1 in FIG. 18 and d1 in FIG. 18) stored in the user data base (a in FIG. 18) corresponding to the same user identification code by the character selection reservation process and the character selection process described above from the table of a group of effective characters (c in FIG. 18) stored in the user data base (a in FIG. 18) corresponding to the user identification code in each user station. Here, the table of a group of effective characters (c in FIG. 18) is constituted by a table of the holding number of every kind of the "creature" characters and the holding number of every kind of the "vehicle" characters, for example, as shown in c1 in FIG. 18. Returning now to the process of c in FIG. 15, the decision of the attack preference character in accordance with the attack order for every character position by the above process is to sort the group of characters paying attention to the quickness (AGI) in the character and position reference table (1 in FIG. 18) for a pair of teams selected and oppose by the process of f in FIG. 14. The "creature" characters whose numerical value of the quickness (AGI) is large in the character and position reference table for a pair of teams described above are selected one by one as the attack preference "creature" characters whereby either one attack preference "creature" character out of a pair of teams of characters opposed is decided as the object for a series of succeeding simulation game processes.

Incidentally, in the above-described example of process, the group of characters is sorted to select the attack preference "creature" character paying attention to the quickness (AGI) in the character and position reference table (e1 in FIG. 18) for a pair of teams. However, the group of characters may be sorted to select the attack preference "creature" character paying attention to the position itself in the character and position reference table (e1 in FIG. 18), that is, the attack order depending on the position.

Now, when one attack preference "creature" character is decided by the above process (c in FIG. 15), supposing the attack preference "creature" character occupying the corresponding position in the team opposed with respect to the battle position of the attack preference "creature" character decided, for example, the "right" position of the team organized by player characters out of a pair of teams opposed, the computer 3a then judges if the corresponding "creature" character occupying the "right" position for the team organized by opposite characters is arranged thereat (d in FIG. 15). In the case where the judgement result (d in FIG. 15) is "Yes", and the "creature" character is arranged in the corresponding battle position, the attack force (AP) in the character and position reference table (e1 in FIG. 18) relating to the attack preference "creature" character is subtracted (e in FIG. 15) from the durable force (HP) in the character and position reference table (e1 in FIG. 18) relating to the corresponding "creature" character arranged thereat, and reduced and extinguished till the durable force (HP) in the character and position reference table (e1 in FIG. 18) relating to the corresponding "creature" character is 0, at which time, with respect to the corresponding "creature" character, an arrangement thereof on the corresponding battle position in the simulation game operation process is erased (f in FIG. 15), and next attack preference "creature" character (which may be a "creature" character for a team organized by opposite player characters) is then decided and the above process is continued with respect to all the attack preference "creature" characters, in other words, all the "creature" characters for a pair of teams opposed (c in FIG. 15). On the other hand, in the case where the judgement result (d in FIG. 15) is "No", and the "creature" character is not arranged in the corresponding battle position, or the arrangement thereat is erased (f in FIG. 15), the attack force (AP) in the character and position reference table (e1 in FIG. 18) relating to the attack preference "creature" character is subtracted (g in FIG. 15) from the durable force (HP) in the character and position reference table (e1 in FIG. 18) relating to the "vehicle" character in which the "creature" character arranged thereat is ought to be carried to judge if the durable force (HP) in the character and position reference table (e1 in FIG. 18) relating to the "vehicle" character is reduced to 0 and extinguished (h in FIG. 15). In the case where the judgement result (h in FIG. 15) is "No" and the durable force (HP) relating to the "vehicle" character remains, next attack preference "creature" character is decided, and a series of the above processes (c, d, e, f, g and h in FIG. 15) is continued. On the other hand, in the case where the judgement results (h in FIG. 15) is "Yes", and the durable force (HP) relating to the "vehicle" character is reduced to 0 and extinguished, a team organized including the attack preference "creature" character with respect to the "vehicle" character at corresponding battle position where the durable force (HP) of the vehicle character does not remain is determined to be a winner, and conversely, a team organized including the "vehicle" character itself at the corresponding battle position where the durable force (HP) of the vehicle character does not remain is determined to be a loser. The computer 3a gets access to an address region of the user data base (a in FIG. 18) corresponding to both user identification codes of a pair of teams to store and update (i in FIG. 15) the number of victories and/or defeats as the battle results on the battle result table (1 in FIG. 18).

Then, the computer 3a gets access to a separate address region of the user data base corresponding to the user identification codes of both teams in a similar manner to store and update (j in FIG. 15), as a battle progress table, the battle progresses on the battle progress table (k in FIG. 18), that is, the progress in which the durable force (HP) of the "creature" character at the corresponding position reduces by the subtraction process (e in FIG. 15) of the attack force (AP) of the attack preference "creature" character executed one by one of the attack preference "creature" characters in a pair of teams opposed, and the progress in which the durable force (HP of the corresponding "vehicle" character at the corresponding position reduces by the subtraction process (g in FIG. 15) of the attack force (AP) of the attack preference "creature" character executed with respect to the corresponding "creature" characters the durable force (HP) of which does not remain after the durable force (HP) of the corresponding "creature" character has not been remained, to terminate the sub-routine process of the simulation game operation (k in FIG. 15) and return to the process (g in FIG. 1). When on the node where a pair of teams of characters have been opposed there exist no other pairs of teams o characters with respect to which the simulation game operation process has not been completed, the judgement result in d in FIG. 14 is "No" and concurrently when the character encountering process has been completed with respect to all the nodes on the background information (g in FIG. 18) to have the judgement result in b in FIG. 14 turned "Yes" then the character encountering process in the encountering decision process is also terminated (h in FIG. 14). In this case, the simulation game operation processes (g in FIG. 14) and a to k in FIG. 15) connected to a series of encountering event decision processes are executed to thereby realize player character simulation game operation means I and opposite character simulation game operation means J in FIG. 1. Further, the associated processes are executed in co-operation with the core process in c in FIG. 15 to thereby realize attack preference player character decision means and attack preference opposite character decision means, the associated processes are executed in co-operation with the core process in e in FIG. 15 to thereby realize opposite "creature" character durable force update means and player "creature" character durable force update means, the associated processes are executed in co-operation with the core processing in FIG. 15 to thereby realize opposite "vehicle" character durable force update means and player "vehicle" character durable force update means, and the associated processes are executed in cooperation with the core process in i in FIG. 15 to thereby realize player character battle result counting means and opposite character battle result counting means.

At a suitable point of time after execution of the above-described simulation game operation process, when either of the pair of teams opposed team by team in the simulation game operation process, that is, in the user stations relating to either of plural paired teams, the simulation display instruction operation by depression of a fixed key on the keyboard is carried out, a computer 2a in a user station 2A executes a program to execute a series of jobs on the user station side in connection with the simulation display process for displaying and confirming the results of the simulation game on the user station 2A side. That is, the computer 2a having started the simulation display process (a in FIG. 16) transmits to the game management station 3 via a network a transfer request by which the contents of a battle progress table (k in FIG. 18) pertinent to a user identification code identifying each user station are requested to transfer from the game management station to a user station. More specifically, the battle progress at user's end as well as the contents of a battle result table (1 in FIG. 18) in the user data base (a in FIG. 18) installed on the game management station both of which are pertinent to the user identification code move typically, the battle results in terms of the number of victories and/or defeats of a user are requested to transfer from the game management station to his user station. Then, upon receipt of the transfer request, the computer 3a in the game management station 3 starts the transfer request response process of the battle progress table and the battle result table as the job on the game management station 3 side for the simulation display process (a in FIG. 17) to identify the user identification code relating to the transfer request (Request 6 in FIG. 17), and gets access to an address in the address region assigned to the user information (b in FIG. 18) identified by the process (b in FIG. 17) to read the battle progress of the battle progress table (k in FIG. 18) and the number of victories and/or defeats as the battle results of the battle result table (1 in FIG. 18), both of which are pertinent to the user station 2A and transferred to the designated user station 2A through a response (Response 6 in d in FIG. 17), and the job on the game management station side of the simulation display process terminates (e in FIG. 17).

Figure 16:
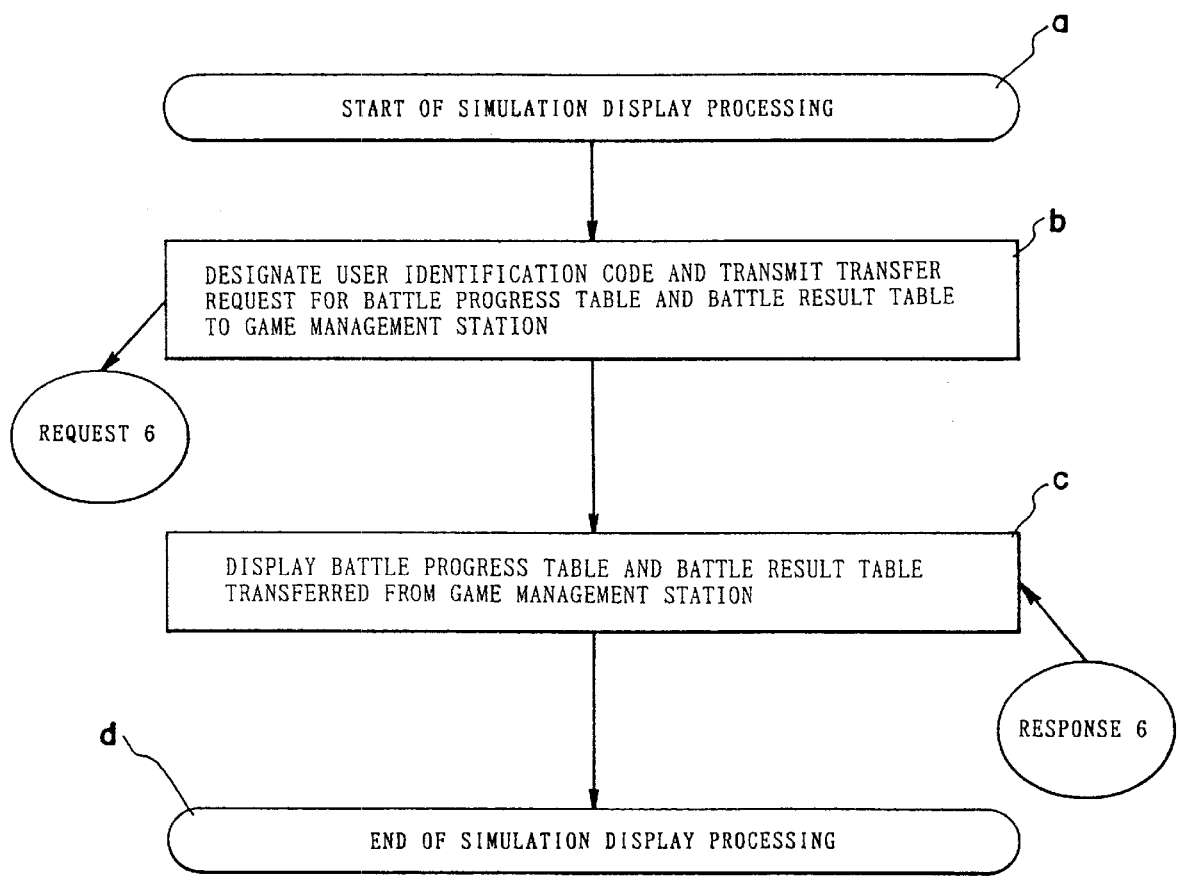
Figure 17:
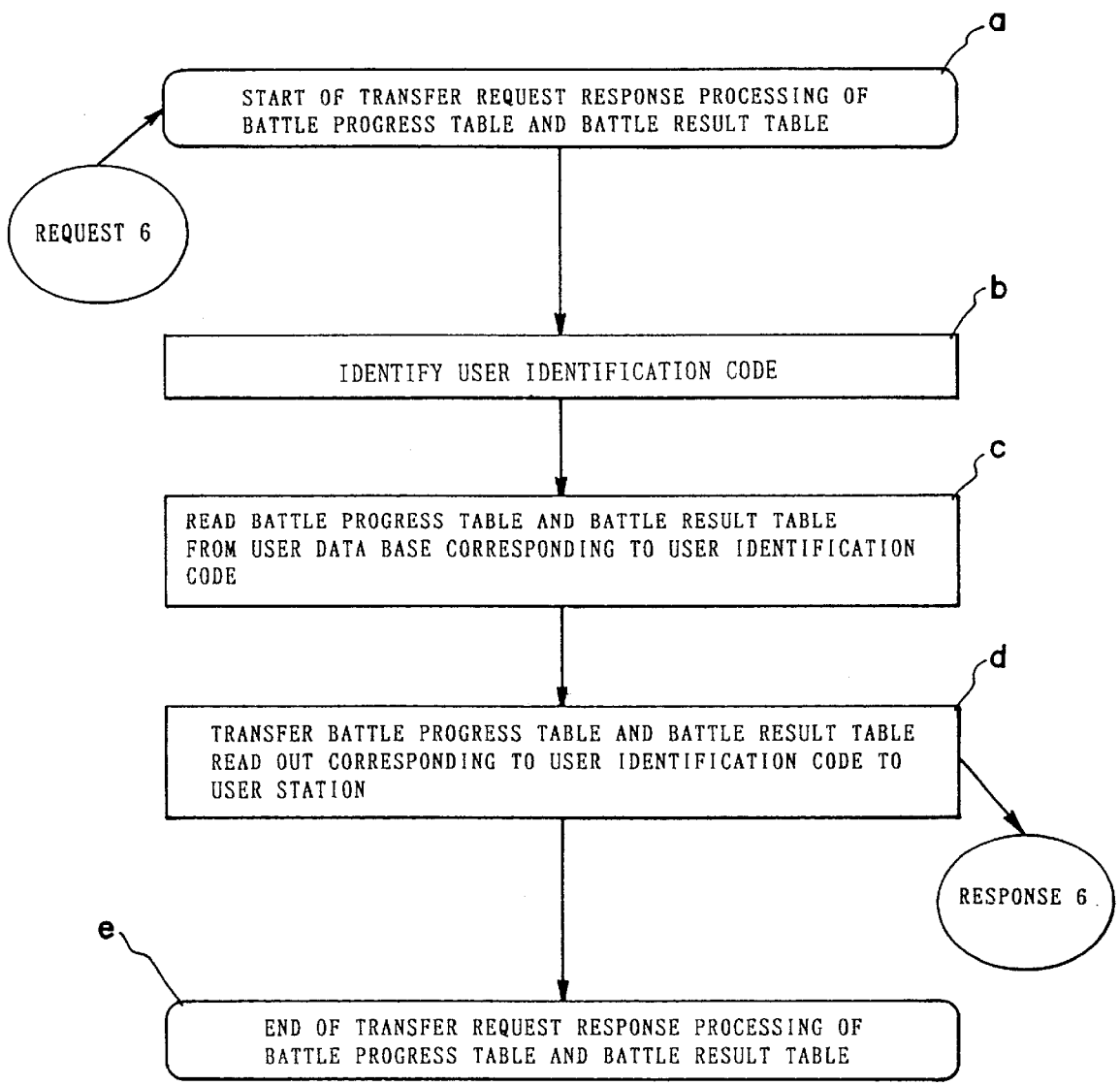

On the other hand, upon receipt of the Response 6 from the game management station 3, the computer 2a in the user station 2A displays the number of victories and/or defeats of the battle progress table and the battle result table transferred on the image plane of the display device 2e (c in FIG. 16) to terminate the job on the user station side of the simulation display process (d in FIG. 16). In this case, the processes a to d in FIG. 16 and the processes a to e in FIG. 17 are executed to realize player character simulation display means k and opposite character simulation display means L and also realize player character battle result counting means and the opposite character battle result counting means.

What is claimed is:

1. A semi-real time simulation type video game device comprising:
    (a) player character selection reservation means A for reserving, during a period of game time, a selection of one team of player characters in response to a player character selection reservation instruction operation by a first player at a point of time within a period of game time as well as within a period of time for an initial character selection reservation prior to multi-player participation in a game;
    (b) opposite character selection reservation means B for reserving a selection of a team of opposite characters in response to an opposite character selection reservation instruction operation by one of a plurality of opposite players opposing said first player at a point of time within a period of game time as well as within a period of time for an initial character selection reservation prior to multi-player participation in a game;

(c) means for defining during the game time period character encountering time points and a character encountering time period, with said character encountering time points appearing intermittently every character encountering time period;

(d) player character selection means C for selecting, as one team of play characters participating in a game, one team of player characters previously reserved by said player character selection reservation means A at a point of character encountering time appearing every character encountering period fixedly or variably set in advance through the period of game time;

(e) opposite character selection means D for selecting, as one team of opposite characters participating in a game, one team of opposite characters previously reserved by said opposite character selection reservation means B at a point of character encountering time appearing every character encountering period;

(f) first player character encountering event candidate reservation means E for reserving a player character encountering event candidate between one team of player characters input by the first player and one team of opposite characters input by said one of said plurality of opposite players, in response to a player character encountering event candidate reservation instruction operation at a point of time during a period of time for an initial character encountering event candidate reservation prior to player participation in a game and at a point of time during a period of game time;

(g) opposite player character encountering event candidate reservation means F for reserving an opposite character encountering event candidate between one team of opposite characters input by said one of the opposite players and one team of player characters input by said first player, in response to an opposite character encountering event candidate reservation instruction operation at a point of time during a period of time for an initial character encountering event candidate reservation prior to multi-player participation in a game and at a point of time during a period of game time;

(h) player character encountering event decision means G for deciding at a point of character encountering time a player character encountering event from a character encountering event candidate reserved by said player character encountering event candidate reservation means E;

(i) opposite character encountering event decision means H for deciding at a point of character encountering time an opposite character encountering event from an opposite character encountering event candidate reserved by said opposite character encountering event candidate reservation means;

(j) player character simulation game operation means I for executing player character simulation operation between one team of player characters and one team of opposite characters which are opposed with each other in a player character encountering event decided at a point of character encountering time to calculate results of player character simulation;

(k) opposite character simulation game operation means J for executing opposite character simulation operation between one team of opposite characters and one team of player characters which are opposed with each other in an opposite character encountering event decided at a point of character encountering time to calculate results of opposite character simulation;

(l) player character simulation display means K for displaying at least one team of player characters selected by said player character selection means C, player character encountering event decided by said player character encountering event decision means G, and results of player character simulation calculated by said player character simulation game operation means I; and (m) opposite character simulation display means L for displaying at least one team of opposite characters selected by said opposite character selection means D, opposite character encountering event decided by said opposite character encountering event decision means H, and results of opposite character simulation calculated by said opposite character simulation game operation means J wherein said features a-m above are interrelated so as to provide a simulation game playable between one team of player characters and one team of opposite characters which are opposed with each other and to create a first player characters encountering event and an opposite character encountering event at said point of character encountering time.

2. The semi-real simulation type video game device according to claim 1, wherein said player character selecting reservation means A and said opposite character selection reservation means B comprise: (i) a single "vehicle" character characterized at least by the maximum character carrying capacity (MAX) and durable force (HP) and (ii) a plurality of "creature" characters characterized at least by weight (SIZE), durable force (HP), attack force (AP) and attack order, and whereby "creature" characters are carried on a "vehicle" character in the range in which the total weight (SIZE) of the "creature" characters does not exceed the maximum character carrying capacity (MAX) of the "vehicle" character.

3. The semi-real time simulation type video game device according to claim 1, wherein said player character encountering event decision means $\underline{C}$ is a player character encountering event decision means which (i) selectively designates a suitable plurality of nodes out of a plurality of nodes on a background route fixedly preset on a background map to form an opposite character search route by means of tying a plurality of nodes selectively designated, (ii) further designates one out of a plurality of nodes on the opposite character search route by means of advancing on each of a plurality of nodes on the opposite character search route every point of character encountering time in accordance with the predesignated order and (iii) decides a player character encountering event when the designated node coincides with one node on a player character search route designated by said opposite encountering event decision means H; and said opposite character encountering event decision means $\underline{H}$ is an opposite character encountering event decision means which (i) selectively designates a suitable plurality of nodes out of a plurality of nodes on a background route fixedly preset on a background map to form a player character search route by means of typing a plurality of nodes selectively designated, (ii) further designates one out of a plurality of nodes on the player character search route by means of advancing on each of a plurality of nodes on the player character search route every point of character encountering time in accordance with the predesignated order, and (iii) decides an opposite character encountering event when the designated node coincides with one node on the opposite character search route designated by said player character encountering event decision means G.

4. The semi-real time simulation type video game device according to claim 3, wherein said player character simulation game operation means I further includes:

attack preference player character decision means for deciding an attack preference player "creature" character in accordance with an attack order depending on the quickness (AGI) of every "creature" character or that depending on the position of every "creature" character position in said first player team of player characters and an attack order depending on quickness (AGI) of every "creature" character or that depending on the position of every "creature" character in the one team of opposite characters;

opposite "creature" character durable force update means for executing an attack from the attack preference player "creature" character on an opposite "creature" character occupying a battle position in relation to a position of the attack preference player "creature" character in one team of opposite characters opposed, and subtracting the attack force (AP) of the attack preference player "creature" character from the durable force (HP) of the opposite "creature" character to update the durable force (HP) of the opposite "creature" character;

opposite "vehicle" character durable force update means for executing an attack from the attack preference player "creature" character on an opposing "vehicle" character in one team of opposite characters opposed when the durable force (HP) of the opposite "creature" character occupying a battle position in relation to a position of the attack preference player "creature" character is distinguished, and subtracting the attack force (AP) of the attack preference player "creature" character from the durable force (HP) of the opposite "vehicle" character to update the durable force (HP) of the opposite "vehicle" character; and player character battle result counting means for counting the player character battle results when the updated durable force (HP) of the opposite "vehicle" character is distinguished; and said opposite character simulation operation means J further includes:

attack preference opposite character decision means for deciding an attack preference opposite "creature" character in accordance with the attack order of every "creature" character or that of every "creature" character position in one team of opposite characters and the attack order of every "creature" character or that of every "creature" character position in one team of player characters opposed on one team of opposite characters;

player "creature" character durable force update means for executing an attack from the attack preference opposite "creature" character on a player "creature" character occupying a battle position in relation to a position of the attack preference opposite "creature" character in one team of opposite characters opposed, and subtracting the attack force (AP) of the attack preference player "creature" character from the durable force (HP) of the player "creature" character to update the durable force (HP) of the player "creature" character;

player "vehicle" character durable force update means for executing an attack from the attack preference opposite "creature" character on a player "vehicle" character in one team of player characters opposed when the durable force (HP) of the player "creature" character occupying a battle position in relation to a position of the attack preference opposite "creature" character is distinguished, and subtracting the attack force (AP) of the attack preference opposite "creature" character from the durable force (HP) of the player "vehicle" character to update the durable force (HP) of the player "vehicle" character, and opposite character battle result counting means for counting the opposite character battle results when the updated durable force (HP) of the player "vehicle" character is distinguished.

5. The semi-real time simulation type video game device according to claim 1, wherein one team of player characters comprises a single player character, and one team of opposite characters comprises a single opposite character.

6. The semi-real time simulation type video game device according to claim 1, wherein the attack order is the quickness (AGI) depending on each character.

* * * * *